US010102510B2

(12) United States Patent
Yau et al.

(10) Patent No.: US 10,102,510 B2
(45) Date of Patent: Oct. 16, 2018

(54) METHOD AND SYSTEM OF CONDUCTING A CRYPTOCURRENCY PAYMENT VIA A MOBILE DEVICE USING A CONTACTLESS TOKEN TO STORE AND PROTECT A USER'S SECRET KEY

(71) Applicant: HOVERKEY LTD., London (GB)

(72) Inventors: Arnold Yau, London (GB); Steve Ives, London (GB); Chris Porter, Bury St Edmunds (GB)

(73) Assignee: Hoverkey Ltd., London (GB)

( * ) Notice: Subject to any disclaimer, the term of this patent is extended or adjusted under 35 U.S.C. 154(b) by 229 days.

(21) Appl. No.: 15/156,072

(22) Filed: May 16, 2016

(65) Prior Publication Data

US 2016/0261411 A1 Sep. 8, 2016

Related U.S. Application Data

(63) Continuation-in-part of application No. 14/855,186, filed on Sep. 15, 2015, which is a continuation of
(Continued)

(30) Foreign Application Priority Data

Nov. 28, 2012 (GB) .................................. 1221433.4
Mar. 1, 2013 (GB) .................................. 1303677.7

(51) Int. Cl.
*H04L 9/32* (2006.01)
*G06Q 20/06* (2012.01)
(Continued)

(52) U.S. Cl.
CPC ........... *G06Q 20/065* (2013.01); *G06F 21/34* (2013.01); *G06F 21/445* (2013.01);
(Continued)

(58) Field of Classification Search
CPC ............. G06Q 20/065; G06Q 20/3821; G06Q 20/3829; G06Q 20/3278; G06Q 20/3678;
(Continued)

(56) References Cited

U.S. PATENT DOCUMENTS

| 8,539,233 | B2 | 9/2013 | Dubhashi et al. |
| 8,788,418 | B2 | 7/2014 | Spodak |

(Continued)

FOREIGN PATENT DOCUMENTS

| GB | 2 423 396 A | 8/2006 |
| GB | 2 476 989 A | 7/2011 |
| WO | WO 2012/103584 A1 | 8/2012 |

OTHER PUBLICATIONS

The International Bureau of WIPO, "International Preliminary Report on Patentability" in application No. PCT/GB2013/053138, dated Jun. 2, 2015, 7 pages.
(Continued)

*Primary Examiner* — Catherine Thiaw
*Assistant Examiner* — Thomas Ho
(74) *Attorney, Agent, or Firm* — Hickman Palermo Becker Bingham LLP

(57) ABSTRACT

A method and system of conducting a cryptocurrency payment via a mobile device, using a contactless token to store and protect a user's secret key. A cryptocurrency wallet encrypted with the secret key is received by the mobile device from the token. A cryptocurrency payment instruction is received by the mobile device, prompting for a user credential to approve the instruction. In response the mobile device sends to the token a message comprising the encrypted wallet together with the payment instruction and the user credential. Using the secret key, the token then decrypts the cryptocurrency wallet from the encrypted wallet and creates a payment transaction by digitally signing the
(Continued)

payment instruction, and transmitting the payment transaction to a cryptocurrency network or exchange. Confirmation of the transaction requires either a PIN, biometric or fingerprint on the mobile device, or authentication via button press, PIN or fingerprint on the token.

24 Claims, 13 Drawing Sheets

Related U.S. Application Data application No. 14/174,727, filed on Feb. 6, 2014, now Pat. No. 9,210,133, which is a continuation of application No. 14/091,183, filed on Nov. 26, 2013, now abandoned, which is a continuation-in-part of application No. 13/706,307, filed on Dec. 5, 2012, now Pat. No. 9,135,425.

(51) Int. Cl.
| | |
|---|---|
| *H04L 29/06* | (2006.01) |
| *G06F 21/34* | (2013.01) |
| *G06F 21/44* | (2013.01) |
| *G06Q 20/32* | (2012.01) |
| *G06Q 20/36* | (2012.01) |
| *G06Q 20/38* | (2012.01) |
| *H04W 12/06* | (2009.01) |
| *G06Q 20/40* | (2012.01) |
| *H04W 4/80* | (2018.01) |
| *H04L 9/06* | (2006.01) |

(52) U.S. Cl.
CPC ..... *G06Q 20/3278* (2013.01); *G06Q 20/3678* (2013.01); *G06Q 20/3821* (2013.01); *G06Q 20/3829* (2013.01); *G06Q 20/38215* (2013.01); *G06Q 20/4097* (2013.01); *H04L 9/3213* (2013.01); *H04L 9/3226* (2013.01); *H04L 63/0428* (2013.01); *H04L 63/0492* (2013.01); *H04L 63/083* (2013.01); *H04L 63/0807* (2013.01); *H04L 63/0853* (2013.01); *H04L 63/0869* (2013.01); *H04L 63/105* (2013.01); *H04L 63/18* (2013.01); *H04W 4/80* (2018.02); *H04W 12/06* (2013.01); *G06Q 2220/00* (2013.01); *H04L 9/0637* (2013.01); *H04L 63/0861* (2013.01); *H04L 2209/56* (2013.01); *H04L 2209/80* (2013.01); *H04L 2463/082* (2013.01)

(58) Field of Classification Search
CPC ......... G06Q 20/38215; G06Q 2220/00; G06Q 20/4097; H04W 4/80; H04W 12/06; H04L 63/0807; H04L 63/105; H04L 63/18; H04L 9/3226; H04L 63/0869; H04L 63/083; H04L 9/3213; H04L 63/0428; H04L 63/0492; H04L 2209/80; H04L 2209/56; H04L 63/0861; H04L 9/0637; H04L 2463/082; G06F 21/445; G06F 21/34

See application file for complete search history.

(56) References Cited

U.S. PATENT DOCUMENTS

| | | | | |
|---|---|---|---|---|
| 9,672,499 | B2 * | 6/2017 | Yang | .................... G06Q 20/065 |
| 2003/0028653 | A1 | 2/2003 | New et al. | |
| 2005/0044398 | A1 | 2/2005 | Ballinger et al. | |
| 2007/0125840 | A1 | 6/2007 | Law | |
| 2008/0209225 | A1 | 8/2008 | Lord et al. | |
| 2008/0289030 | A1 | 11/2008 | Poplett | |
| 2009/0092253 | A1 | 4/2009 | Asipov et al. | |
| 2010/0211507 | A1 | 8/2010 | Aabye et al. | |
| 2010/0241867 | A1 | 9/2010 | Brown et al. | |
| 2011/0117966 | A1 | 5/2011 | Coppinger | |
| 2011/0142234 | A1 | 6/2011 | Rogers | |
| 2011/0320802 | A1 | 12/2011 | Wang et al. | |
| 2012/0117636 | A1 | 5/2012 | Adams | |
| 2012/0265596 | A1 | 10/2012 | Mazed | |
| 2012/0272307 | A1 | 10/2012 | Buer | |
| 2013/0024424 | A1 | 1/2013 | Prahlad et al. | |
| 2013/0198826 | A1 | 8/2013 | Waldron | |
| 2013/0214902 | A1 | 8/2013 | Pineau et al. | |
| 2014/0149746 | A1 | 5/2014 | Yau | |
| 2014/0372319 | A1 | 12/2014 | Wolovitz | |
| 2015/0261948 | A1 * | 9/2015 | Marra | ..................... G06F 21/34 726/4 |
| 2015/0262176 | A1 * | 9/2015 | Langschaedel | ...... G06Q 20/065 705/71 |
| 2015/0324787 | A1 * | 11/2015 | Schaffner | ............... G06Q 20/06 705/67 |
| 2015/0324789 | A1 * | 11/2015 | Dvorak | .............. G06Q 20/3823 705/67 |
| 2015/0332224 | A1 * | 11/2015 | Melika | ............... G06Q 20/3678 705/71 |
| 2016/0085955 | A1 * | 3/2016 | Lerner | .................... G06F 21/31 726/20 |
| 2016/0098723 | A1 * | 4/2016 | Feeney | ............. G06Q 20/4016 705/75 |
| 2016/0162897 | A1 * | 6/2016 | Feeney | ............. G06Q 20/4014 705/71 |
| 2016/0260091 | A1 * | 9/2016 | Tobias | ............... G06Q 20/3678 |

OTHER PUBLICATIONS

Menezes, Vanstone, Oorschot: "Handbook of Applied Cryptography", dated 1997, CRC Press LLC, USA, 794 pages.
European Patent Office, "Search Report" in application No. 13 801 699.3 -1870, dated Nov. 8, 2017, 6 pages.
U.S. Appl. No. 14/174,727, filed Feb. 6, 2014, Office Action, dated Apr. 9, 2014.
U.S. Appl. No. 14/174,727, filed Feb. 6, 2014, Final Office Action, dated Sep. 18, 2014.
U.S. Appl. No. 14/174,727, filed Feb. 6, 2014, Office Action, dated Jan. 21, 2015.
U.S. Appl. No. 14/174,727, filed Feb. 6, 2014, Notice of Allowance, dated Jun. 10, 2012.
U.S. Appl. No. 13/706,307, filed Dec. 5, 2012, Office Action, dated Apr. 14, 2014.
U.S. Appl. No. 13/706,307, filed Dec. 5, 2012, Notice of Allowance, dated Mar. 26, 2015.
U.S. Appl. No. 13/706,307, filed Dec. 5, 2012, Final Office Action, dated Oct. 15, 2014.
U.S. Appl. No. 13/706,307, filed Dec. 5, 2012, Advisory Action, dated Feb. 26, 2015.
U.S. Appl. No. 13/706,307, filed Dec. 5, 2012, Corrected Notice of Allowance, dated Aug. 11, 2015.
Aloul et al., "Two factor Authentication Using Mobile Phones", Computer Systems and Applications, dated 2009, AICCSA, IEEE, pp. 641-644.
Liou et al. "A Feasible and Cost Effective Two Factor Authentication for Online Transactions", Software Engineering and Data Mining, dated 2010, pp. 47-51.
A Nicholson, "A Mobile Device Security Using Transient Authentication", IEEE Trans. On Mobile Computing 5:11, dated Nov. 2006, at 1489, published in the US, 14 pages.
Menezes et al., "Handbook of Applied Cryptography", dated 1998, CRC Press LLC, USA, 32 pages.
European Patent Office, "Search Report" in application No. PCT/GB2013/053138, dated Apr. 23, 2015, 12 pages.
Yau, U.S. Appl. No. 14/855,186, filed Sep. 15, 2015, Office Action, dated Apr. 23, 2018.

\* cited by examiner

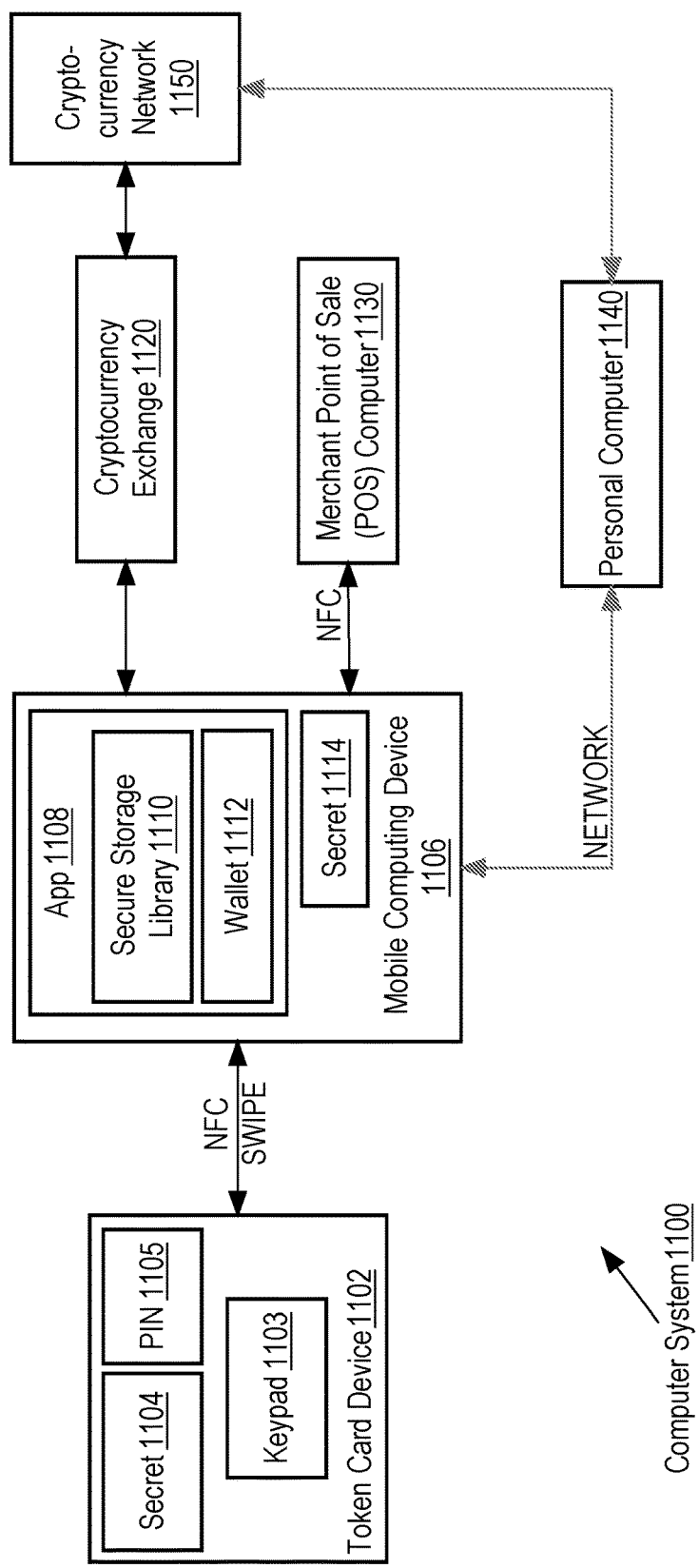

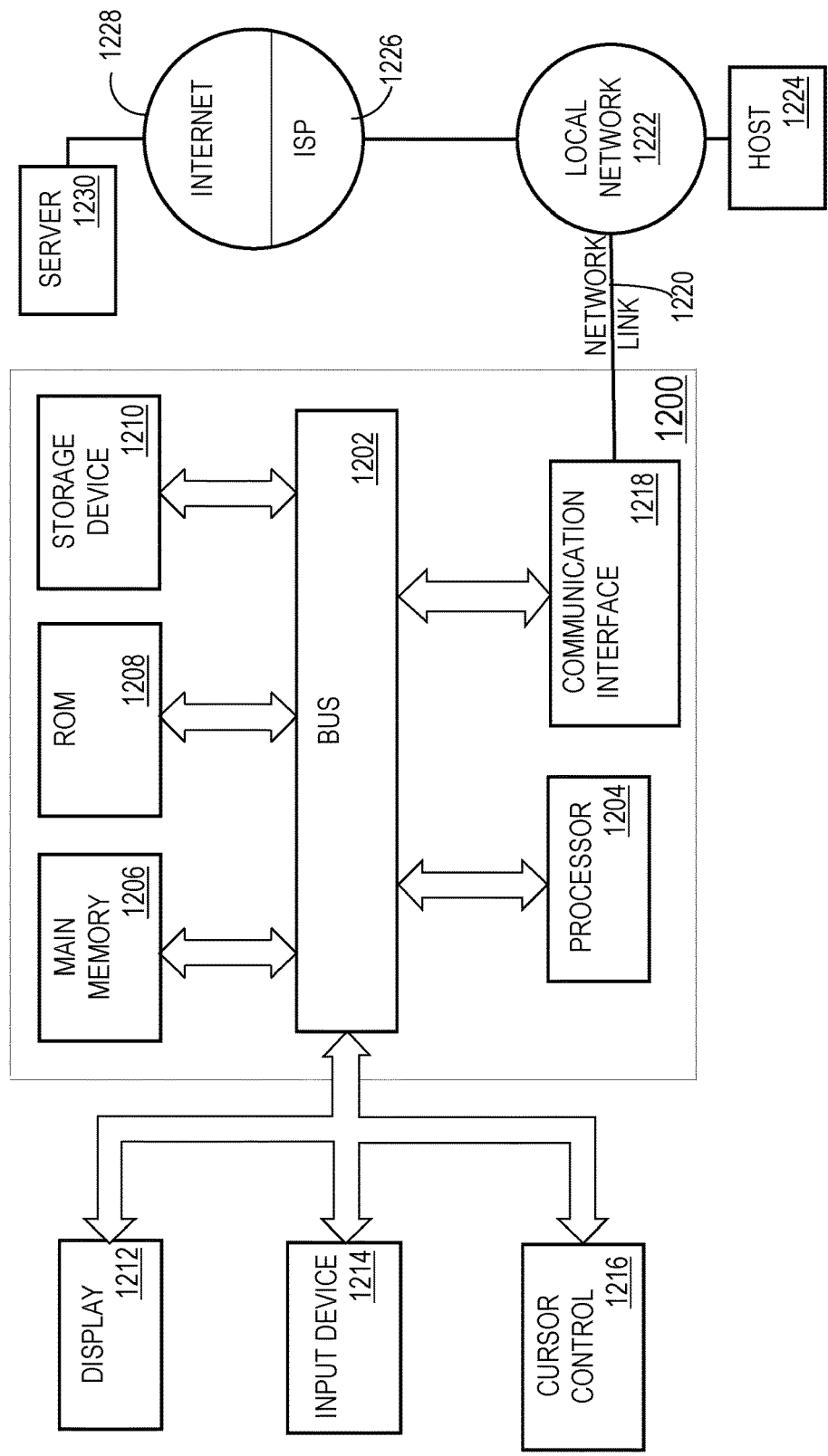

METHOD AND SYSTEM OF CONDUCTING A CRYPTOCURRENCY PAYMENT VIA A MOBILE DEVICE USING A CONTACTLESS TOKEN TO STORE AND PROTECT A USER'S SECRET KEY

BENEFIT CLAIM

This application claims the benefit under 35 U.S.C. § 120 as a Continuation-in-Part of application Ser. No. 14/855,186, filed Sep. 5, 2015, which is a Continuation-in-part of application Ser. No. 14/174,727, filed Feb. 6, 2014, which is a Continuation of application Ser. No. 14/091,183, filed Nov. 26, 2013, now U.S. Pat. No. 9,210,133, which is a Continuation-in-part of application Ser. No. 13/706,307, filed Dec. 5, 2012, now U.S. Pat. No. 9,135,425, and which claims the benefit under 35 U.S.C. § 119 of Great Britain application GB 1221433.4, filed Nov. 28, 2012, and Great Britain application GB 1303677.7, filed Mar. 1, 2013 and granted as GB 2496354.

1. INTRODUCTION

The present application relates to a method and system of authenticating a user to a computer resource accessed via a mobile device using a portable security token (for example a contactless smart card or bracelet), together with a secret that the user can easily remember (for example a PIN code). This secret provides a second, separate preferably independent security factor that can safeguard the computer resource even if the portable security token and the mobile device are both lost or stolen together. A preferred embodiment relates to providing data protection and secure access to applications and stored data accessed via a mobile device (such as a phone or tablet) using a near-field communication (NFC) hardware token or a short range Bluetooth token.

Secure authentication of a user via a mobile device is becoming important in two different situations, firstly for authentication of user access to a computer resource on the mobile device and secondly on a remote server.

Most existing systems employ the use of a simple password or PIN to authenticate the user. Despite the ubiquity of password-based systems, it has many problems. An ideal password needs to be easily remembered by the user. However, in order for passwords to be secure, they should be long and hard to predict, contradictory to the former requirement. This is further exacerbated by the proliferation of passwords for the multitude of applications a user typically uses, for which security best practice recommends different passwords should be used.

In addition to application access, some mobile users wish to ensure a high level of security for data (including entire files and data contained within a file or a data structure) on their device, against a number of external threat scenarios. For example, a user may use an app on a tablet or other portable device that synchronizes files with their desktop PC via an online storage service (e.g. DROPBOX, BOX.COM). Some of the downloaded files may contain confidential information such as business documents. The user wishes to safeguard himself against the possibility of a data breach in the event of theft of the device.

A practical way to achieve this today is to enable device encryption on the mobile operating system, which uses an encryption key derived from the device lock screen password. For maximum security, this password should be long and complex. However using a long and complex password as the password to unlock the lock screen is extremely inconvenient for the user.

Because of this, most users are reluctant to use any password more complicated than a 4 digit PIN code to unlock the lock screen. A skilled attacker will be able to decrypt any files stored on a stolen device with brute force attack methods. Moreover, the confidential data is decrypted whenever the device has been unlocked, even when the user is not using the data, which increases the risk of a data breach unnecessarily.

Another possible approach to data encryption is for the app to generate its own encryption key. The problem with this approach is that the key would either have to be protected by or derived from a password for security, or has to be stored within the app in plaintext form for usability. The former approach inherits the same password complexity issue as the device encryption method above, while the latter offers little security as the attacker who could compromise the plaintext data could just as easily read the plaintext key and decrypt the data. One way to provide an additional level of security to users of mobile devices is by requiring that the user also carries a wearable physical token that communicates with the device using a wireless communication system e.g. Bluetooth or Bluetooth Low Energy (BLE). The mobile device constantly checks for the presence of the token. This token, when present within a range of several metres of the mobile device, constantly verifies that the user is indeed present. When the user departs the token and the device lose contact and the device secures itself against any access until communication with the token is regained.

An example of such a system is described by Nicholson, Corner and Noble in IEEE Transactions on Mobile Computing, Vol 5 No 11 November 2006. There are a number of disadvantages of such a system. The broadcast based communications channel between the token and the mobile device is subject to eavesdropping to an attacker who is within close range of the token and the device. Despite being encrypted, because of the numerous transient authentication events that take place between the token and the device, the attacker is presented with many opportunities to cryptanalyse the authentication messages, as well as to perform traffic analysis without even having to attempt an cryptanalytic attack A thief who steals the mobile device but still remains within range of the security token worn by the device owner will be able to access the resources on the device. Theft of the mobile device and the token together renders the security system useless.

In some other existing systems an additional level of security has been provided by requiring that an NFC or Bluetooth capable mobile phone be first authenticated to the mobile network prior to an application being executed. An NFC/Bluetooth token then provides an asymmetric key to the phone which in turn authenticates to a third-party service by performing digital signature within the phone itself.

A generic example of such a system is shown in US-A-2011/0212707. This, however, displays a number of disadvantages. In particular changing of the application credential requires re-programming or replacement of the token; the number of user credentials secured by the system is limited by the (small) storage capacity of the token; and the loss of the token poses a direct risk of exposure of the user's credentials. In addition, applications running on the mobile device and the server are capable of making use of the described security system only if they have been specifically programmed to do so. The system described cannot be used with pre-existing applications.

Another approach to multi-factor identification is described in US-A-2008/0289030. Here, a contactless token is, upon validation, used to allow access to the authentication credentials secured on the mobile device itself.

This has a number of serious disadvantages, including the necessity of using secure storage on the device. This is normally not available to application developers as it is maintained and controlled by the manufacturer of the device (e.g. mobile phone) or the supplier of the underlying operating system or a mobile network operator. Also, making use solely of a token identifier as a means of validating the token is likely to be insecure. RFID tokens can typically be read by any compatible reader, and can easily be cloned.

Yet a further approach is described in WO-A-2011/089423. This describes a system where the presence of a contactless token is used to authorize execution of a secure function or application, and is aimed primarily at mobile wallet uses.

Again, the system described has a number of disadvantages, primarily that it uses a form of logical control that is relatively easy to circumvent.

More generally, in the enterprise environment there exists significant security risk from allowing users to connect mobile devices into the network due to increased likelihood of unauthorized data access (leading to loss of data confidentiality and/or integrity) resulting from:
  Inadvertently disclosed passcodes such as PINs or alphanumeric codes, e.g. from shoulder surfing
  Easily guessed passcodes
  Lost or stolen devices that are inadequately protected
  Unsupervized use of devices by a third party
  The Hoverkey system aims to provide solutions for applications to counter these threats.

With the present invention, the user may store a master key of high cryptographic strength (128 bits or above presently) on the portable security token, and this key can be used to either directly protect an app's data encryption key or a long and complex password, from which a sufficiently long and secure encryption key can be derived. This allows the user to protect any data stored on the device with a very strong encryption key. If the device is stolen, it is then infeasible for any potential attacker to decrypt the encrypted data on it without the associated token.

Credentials may be stored either on the mobile device or, remotely, in the cloud. Cloud storage preferably has the following features:
Protected credentials are always stored in the cloud and retrieved from the cloud before use
Transparent local caching is possible but not meant as permanent storage—should be wiped after a specified time-out period
If device or token is lost, credentials may be removed simply by removing the relevant files from the cloud storage service to avoid potential misuse
Credential synchronisation is possible across devices for the same user, obviating the need for manual entry of the same credentials multiple times.

2. BACKGROUND

2.1 THE INVENTION AND PREFERABLE FEATURES THEREOF

According to the present invention there is provided a method and system of authenticating access to computer resource in a mobile device as set out in the pre-characterising portions of the independent claims. An embodiment also may provide a method and system of authentication an application running on a mobile device.

According to a first aspect of the present invention, a method of authenticating a computer resource on a mobile device comprises:
  storing an encrypted resource authorization;
  transmitting the encrypted authorization to a separate portable security token; on the token, decrypting the encrypted authorization and generating at least partially therefrom an unlock response;
  securely transmitting the unlock response to the mobile device;
  requiring a user to authenticate separately on the mobile device; and
  unlocking the resource if the required unlock response and the separate authentication are both valid.

In an embodiment, the encrypted resource authorization may be on the device. In an embodiment, the requiring step is omitted, and the unlocking is performed without consideration of separate authentication.

The unlock response may comprise a plain authorization, obtained by decrypting the encrypted authorization.

The unlock response may alternatively comprise a function (such as a digital signature) of a plain authorization and, optionally, one or more additional parameters, where the plain authorisation is obtained by decrypting the encrypted authorization. Thus, in one usage mode, the token may verify and decrypt the encrypted authorization. Then, instead of returning a plain authorization to the device, protected by a session or other encryption key, the token may perform some computation on the plain authorization and possibly some other information (typically session-specific parameters), and return the result to the device. Examples include the following:
  Example 1: Digital Signature: function=digital signing function, plain authorization=private signing key; parameter=hash of message; output=digital signature on message hash
  Example 2: Key Derivation: function=HMAC-based key derivation function; plain authorization=key derivation master secret; parameters=session random numbers, output length; output=key derived from master secret
  Example 3: Re-encryption: function=encryption function; plain authorization=encryption key; parameter=(another) encryption key; output=the plain authorization encrypted with a different key
  Example 4: One-Time Passcode (OTP): function=hash-based passcode generation function; plain authorization=OTP secret key; parameter=current counter value; output=passcode computed from counter The authorization may comprise a password, PIN or cryptographic key.

The unlock response may be transmitted to the mobile device under the protection of an encryption key, such as a session key.

The token may store user./token ownership credentials, the decryption on the token being based on the user credentials.

The method provides two-factor (or multi-factor) authentication by requiring a user in addition to authenticate separately on the mobile device, for example by the authentication on the mobile device being validated on the token before the unlock code is sent. Preferably, the method requires a proof of knowledge (eg a PIN) from the device (and ultimately from the user) before decrypting the authorization. The proof may be provided after mutual authentication. Alternatively, the device authentication may be entirely independent of the token authentication.

In an embodiment, the token may operate in single factor mode, which decrypts authorization after mutual authentication with the device.

A service may be run on the mobile device which controls device cryptographic functions and access to the resource. An applet may be run on the token which provides token cryptographic functions.

The user credentials may be generated by the token and never leave the token (or the app running on the token).

Preferably, the encrypted authorization stored on the mobile device can be decrypted solely with the corresponding user credentials stored on the token.

The method may include verifying integrity on the token by a message authentication code (MAC) received from the device.

The method may include verifying the integrity of the encrypted authorization on the token prior to decryption.

The device and the token may perform cryptographic mutual authentication before transmission of the encrypted authorization.

The encryption, decryption and/or the mutual authentication may be provided by symmetric key cryptography A user secret may be passed from the device to the token and may be validated by the token before the decryption operation takes place. The resource may comprise data, or an application running or stored on the mobile device.

According to another aspect of the invention there is provided:
a mobile device;
a token including token storage for storing private user credentials, a token communications system, and a token processor providing cryptographic functions;
and wherein in use an encrypted authorization is transmitted by the device communications system to the token; is decrypted on the token using the user credentials; the token generating at least partially therefrom an unlock response, the unlock response being securely transmitted by the token communications system to the mobile device; requiring a user to authenticate separately on the mobile device; and unlocking the resource if the required unlock response and the separate authentication are both valid.

The device communications system and the token communications system may communicate over the air, eg by Near Field Communication (NFC), Bluetooth or BLE. Alternatively, the device communications system and the token communications system may communicate only when the token is in contact with the device via a physical interface.

The device communications system may send a user secret to the token which is validated by the token before the decryption operation takes place.

The device communications system may send a message authentication code (MAC) to the token, which is validated by the token before the decryption operation takes place.

According to a further aspect of the invention, there is provided:
a hardware token for authenticating access to a computer resource via a mobile device, the token comprising:
token storage for the storage of a plurality of user credentials;
a token communications system for communicating with a mobile device;
a token processor providing cryptographic functions; and
wherein, in use:

on receipt by the token communications system of an encrypted authorization, the token processor verifies the integrity and decrypts the encrypted authorization and generates at least partially therefrom an unlock response, and wherein the token communications system securely transmits the unlock response for use by a mobile device.

The preferred system of the present invention preferably comprises:
1. One or more mobile devices
2. An NFC, Bluetooth or BLE token programmed to:
   a) Be able to mutually authenticate with any of the user's devices
   b) Respond only the commands issued by any of the user's devices
   c) Perform encryption and integrity protection of data provided by the device
   d) Return the cryptographically protected data
   e) Perform the decryption and integrity verification on previously protected data
   f) Optionally require validation of a user PIN prior to performing decryption operations
3. A password manager application installed each the mobile device
4. Any number of third-party applications secured by the system The mobile device may comprise any mobile or portable hardware device which is capable of running user applications and handling communication and cryptographic functions. Typical devices include mobile phones, tablets, laptop computers and the like. The token may be any portable or mobile hardware token which is capable of communication (preferably contactless communication) with a mobile device and which includes storage and an executable system which is capable of handling communications and cryptographic functions.

The protected computer resource may be held in a device memory or store or (where an application) may be held ready for execution or may be actually running in an execution environment. To that end, the device may include a store, a memory, and a processor.

Typically, the token will be a contactless smart card, although other tokens held by or carried on the person would be equally possible. Suitable tokens might include a ring to be worn on the user's finger, a device incorporated into a watch, belt, spectacles, clothing or anything else normally worn by the user, or even a device embedded under the user's skin. The token may have button(s), touch-sensitive area(s) or other means to allow manual or other user feedback/input via the token.

The application authentication stored on the device may comprise an application password or PIN. The user credentials stored on the token may comprise a private cryptographic key.

It is preferred that communication between the token and the mobile device makes use of NFC, although other channels could equally well be used including Bluetooth, Bluetooth Low Energy (BLE), or other types of radio frequency communication. Tokens requiring contact with the mobile device, including swipe cards and electrical contactcards are also envisaged. According to another aspect of the invention, a system of authenticating access to a computer resource on a mobile device with a portable security token comprises:
a device including a computer resource to be protected, a device communications system, and device storage for storing encrypted resource authorization;

a token including token storage for storing private user credentials, a token communications system, and a token processor providing cryptographic functions;

and wherein in use the encrypted authorization stored on the device is transmitted by the device communications system to the token, is decrypted on the token using the user credentials, the token generating at least partially therefrom an unlock response, the unlock response being securely transmitted by the token communications system to the mobile device, and the device being arranged to unlock the resource if the received unlock response is valid.

According to a further aspect of the invention, a hardware token for authenticating a computer resource on a mobile device, the token comprises:

token storage for the storage of a plurality of user credentials;

a token communications system for communicating with a mobile device;

a token processor providing cryptographic functions; and wherein, in use:

on receipt by the token communications system of an encrypted authorization, the token processor verifies the integrity and decrypts the encrypted authorization and generates at least partially therefrom an unlock response, and wherein the token communications system securely transmits the unlock response for use by a mobile device.

2.2 HOVERKEY LEVEL 1

In the preferred embodiment the present invention is preferably embodied within a product called Hoverkey. Hoverkey's design is optimised for ease of integration with existing mobile apps and web apps, as well as ease of use. It implements a secure user credential (e.g. password) storage and retrieval system, secured using NFC tokens.

The present application is particularly concerned with an embodiment that uses a specific security design, referred to in this description as "level 1". References to Hoverkey level 1 (or Hoverkey L1) should be understood accordingly.

2.2.1 Security Concept

The concept behind Hoverkey L1 is designed to work with all existing applications which authenticate the user using a user name and password combination, although authentication methods other than passwords may be used. Typically, without any changes to the application to be accessed, the technology simply replaces manual entry of the user's password with a touch of an NFC token. This embodiment offers the following advantages:

No changes required for the application server, which allows easy integration

Changes to any existing application clients can be easily implemented through the use of a Hoverkey Component.

Better security by letting technology to "remember" passwords for the user, which means The user can choose passwords that are more secure (longer and more "random")

The user can choose different password for different accounts without the fear or inconvenience of forgotten passwords Eliminates the need for entering alphanumeric passwords on an onscreen keyboard, especially when symbols are included, which is slow and error-prone and subject to shoulder-surfing attacks.

3. OVERVIEW

The invention may be carried into practice in a number of ways and one specific embodiment will now be described, by way of example, with reference to the accompanying drawings, in which:

FIG. 11 illustrates a computer system that is programmed to provide secure storage of cryptocurrencies; and FIG. 12 is a block diagram that illustrates a computer system upon which an embodiment of the invention may be implemented.

3.1 DEPLOYMENT MODEL

At a high level, the preferred Hoverkey deployment model is summarised below:

Each User has one or more NFC-enabled mobile device, which may be provided by company or owned by User.

Each User is issued with a unique NFC security token.

Each NFC token may be paired with all devices belonging to the same User.

The following steps are taken in deploying a Hoverkey:

Hoverkey purchases blank NFC tokens from resellers

Upon receipt of trial or purchase order, Hoverkey formats NFC tokens for the Customer or a partner issuer Upon receipt of the NFC token, the User invokes the activation function The User then configure their Hoverkey-enabled apps with their credentials

3.2 ARCHITECTURE

Figure 1:
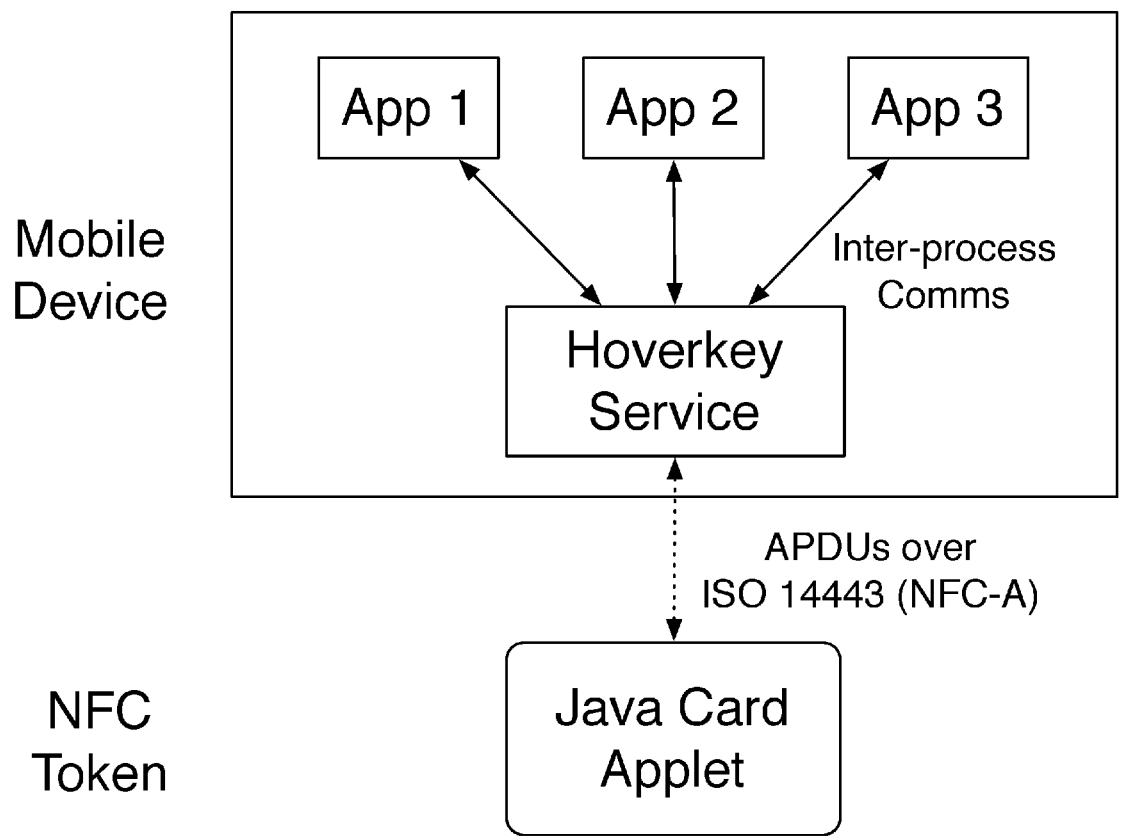
FIG. 1 shows the Hoverkey L1 high level architecture.

The high level architecture of Hoverkey L1 is illustrated in FIG. 1. Each Developer App (App 1, App 2 and App 3 in the diagram) are embedded with the Hoverkey L1 Component, which allows it to communicate with the Hoverkey Service via an inter-process communication (IPC) protocol.

On each mobile device, there is a single instance of Hoverkey Service which accepts requests from an App and when a password is required. Hoverkey Service retrieves the password on behalf of the App through a series of exchanges with the Java Card applet via the NFC interface.

The advantages of using a service include:

Removes the need share authentication keys (for Applet access) between Apps

No need for Apps to require NFC permissions

Centralised, mediated access to Applet which makes it possible to prevent concurrent access.

On the Android platform, possible IPC mechanisms include the Intent method for simple, coarse grained integration, or the Remote Service method using Android interface Definition Language (AIDL) for fine-grained, lower-level integration.

Hoverkey-protected passwords are encrypted by the card Applet at registration and stored on the mobile device within the Hoverkey App. When access is required, the registered App requests the password via the Hoverkey App, which in turns requests the password be decrypted by the Applet.

3.3 MAIN SECURITY DESIGN FEATURES

Activation and Pairing: A Hoverkey token can only be used with a device with which it has been paired (at activation). Each mobile device many only be paired with one token. Each token may be paired with up to four devices.

Registration: To defend against malicious apps, third-party apps may only use Hoverkey services after a secure on-device registration process. Subsequent password access requires proof of previous registration.

Two-Factor: Each password may additionally protected with a user chosen PIN to provide a form of two-factor authentication. Three or more levels of authentication may optionally be provided.

Cryptographic security: Hoverkey uses industry-standard cryptographic algorithms and modes for protection of user passwords, supported by best practices in secure key management.

Token Security: Hoverkey token are security-managed throughout their lifecycle to ensure the risks are minimized at all stages.

3.4 USING HOVERKEY L1

To use Hoverkey L1, the following steps are followed:
1. New Customer organization orders Hoverkey L1 Cards for their mobile users
2. Hoverkey (or Partner) generates an OrgID for the customer.
   a) Optionally, a RegKey is generated for the customer if they intend to develop their own private Apps, which is delivered the Customer or Developer for embedding into their Apps.
3. Hoverkey formats the required number of cards with OrgID, MasterAPIKey, Admin Key, User Authentication Key and PUKs, and send them to Customer or Developer.
4. Customer development team embeds Hoverkey Component into their own App(s) and configure them with their OrgID and RegKey during development
5. User installs Customer or Developer App(s) and Hoverkey App (from Google Play Store)
6. User receives (formatted) token from Sys Admin and activation email (containing an activation URL)
7. User activates token from within Hoverkey App and sets a PIN
   a) The Hoverkey App downloads a configuration profile file
   b) User is reminded to delete activation email when activation completes
8. Third-party Apps register themselves with Hoverkey App (typically with a user name and password—once for each Customer or Developer App)
9. User starts to use Hoverkey-enabled mobile Apps
10. User may pair additional devices to the token up to four devices.
    a) If a Hoverkey server is used, App data may be synchronized from the server
    b) All Hoverkey-enabled Apps must be re-registered on the new device (as per Step 8).

4. SYSTEM COMPONENTS

4.1 MOBILE DEVICE

Hoverkey L1 is preferably supported on NFC-enabled Android smartphones, although other platforms are of course equally possible.

4.2 HOVERKEY L1 APP

The following subsections summaries the functions provided by the Hoverkey L1 App.Token activation
   a) Pairing of NFC token with mobile device
   b) PIN settingToken management
   c) PIN changing
   d) PIN unblocking
   e) Revoking a token
2. App registration—setting user name and password
3. App management
   a) Changing password
   b) De-register an App

4.3 THIRD-PARTY MOBILE APPS

Embed Hoverkey L1 Component according to implementation guidelines

4.4 NFC TOKEN

Figure 2:
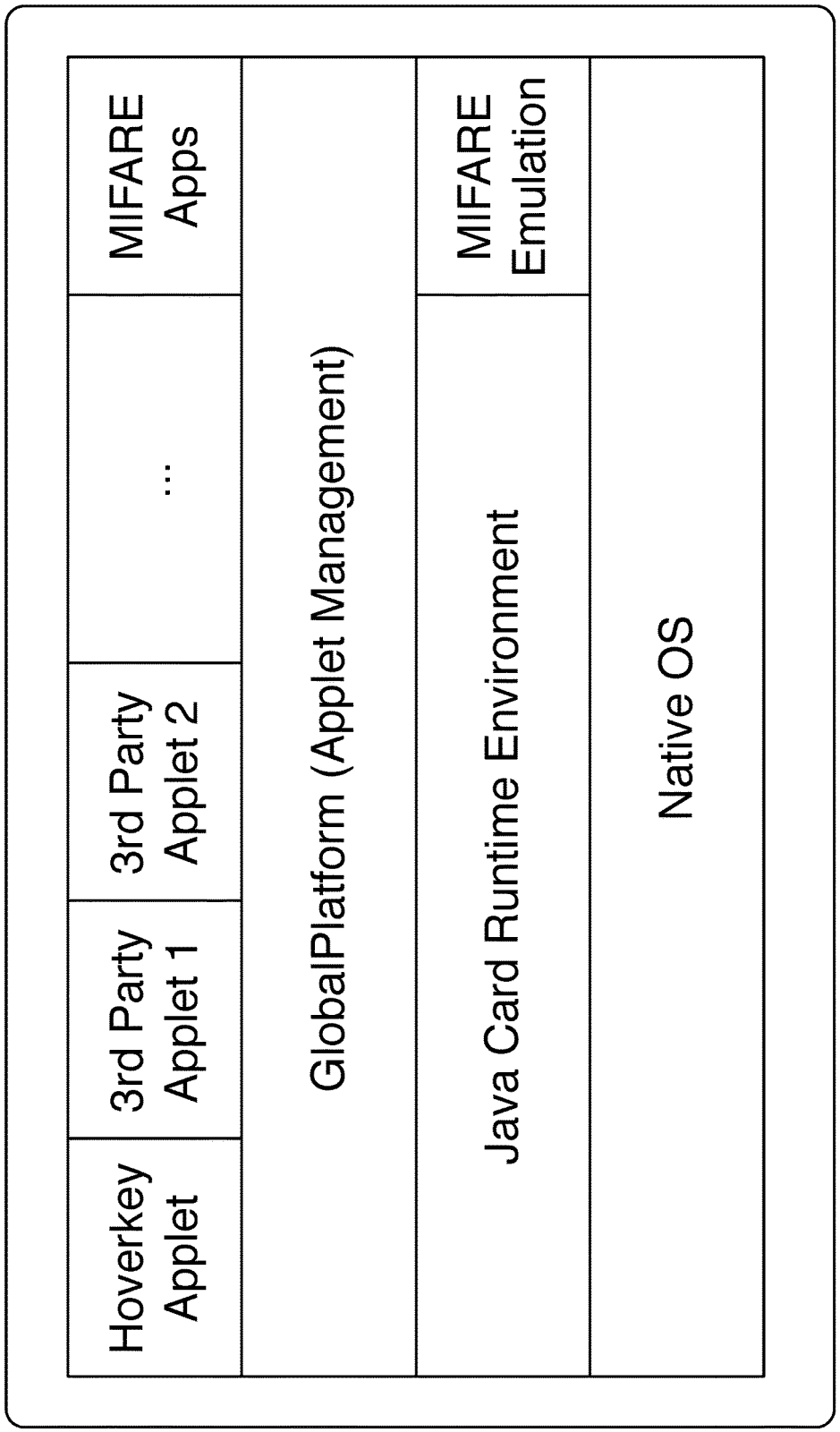
FIG. 2 shows the organization of the Java card and the applets.

FIG. 2 shows the organization of the Java cord and the applets.

The NFC token is a contactless token which supports Java Card and GlobalPlatform specifications. The token preferably has a high level of security approval under the Common Criteria and/or FIPS schemes. The initial product is implemented in the ISO 7810 (credit card) form factor.

The token is designed to support multiple Java Card applets. The Hoverkey system require one applet to be installed, leaving space on the card for third-party applets.

4.5 CLOUD-BASED DATA STORAGE SERVICE

Hoverkey supports on-demand credential retrieval and synchronisation using a cloud base storage service. There are many possible implementations of a cloud service using a variety of protocols and indeed many already exist. At the minimum, a suitable service preferably supports the following functions:
1. Identifying a user with a unique identifier
2. Storage of arbitrary data on the server in an arbitrarily named file and directory
3. Retrieval of previously stored data A more preferable implementation of a Hoverkey credential storage service also provides:
1. Strong authentication of the user
2. Communication with the user device over a secure channel
3. High availability measures
4. Secure facilities management In practice, Hoverkey can support popular cloud services such as DropBox or may provide its own bespoke service for Hoverkey users.

4.5.1 Hoverkey L1 Applet

The applet implements:
The activation process (also known as "personalization" in common smart card terminology) which includes:
  Device/token pairing
  Password Encryption Key (PEK) generation
  Initial User PIN setting
Password encryption/decryption functions
The cryptographic mutual authentication protocol
The Hoverkey Applet stores and manages the following data objects:

| Name/Label | Description |
| --- | --- |
| TokenID | A unique identifier for each applet installation |
| DeviceIDs | A list of (up to 4) DeviceIDs associated with this card - the ID should support ASCII text e.g. "GalaxyS3-894579", "DavesTablet-9792234" (so that when the IDs are listed, user can tell which ID corresponds to which device). |
| Password Encryption Key (PEK) | Derived from random values, the keys for encrypting and decrypting User's App passwords, as well as their integrity protection and verification |
| User PIN | The User's PIN used for accessing passwords. It is always set during activation, but each App may decide whether if a PIN is required. The PIN has an associated PIN Tries Remaining counter. |
| User PUKs | The User's PIN Unblock Keys. There is also a single Unlock Tries Remaining counter. |
| Logs | Activity logs for recent auditable events |
| OrgID | A unique identifier for Customer or Developer organization |
| MasterAPIKey | A unique key associated with the OrgID for authentication of private third-party Apps |

4.5.2 Token Lifecycle

The following outlines the lifecycle of an NFC token:
1. Reseller supplies cards to Hoverkey
2. Card formatting
   a) Low-volume deployments: Hoverkey formats cards and supplies to Customer or Developer.
   b) High-volume deployments: Hoverkey provides to a trusted third party card printer.:
      Card overlay graphics
      OrgID, MasterAPIKey and AdminKey
      Set of Authentication keys and PUKs
3. User activates card
4. Activated token is:
   a) Revoked and replaced when lost or stolen
   b) Returned and replaced if becomes defective
   c) Returned when User leaves Customer organization
   d) Updated or replaced when a new applet or a new version of the existing applet are available for the User

5. HIGH LEVEL SECURITY DESIGN

5.1 OVERVIEW

The Hoverkey L1 App may be downloaded by the User from the Google Play Store and therefore does not have any Customer specific information at installation.

NFC tokens are formatted by Hoverkey which includes loading of Customer data. Upon activation, this data is transferred across to the Hoverkey L1 App to allow Developer Apps to be registered.

Developer Apps need to be registered with the Hoverkey Service (part of the Hoverkey L1 App) prior to becoming NFC-enabled. Registration involves securing the user's password with his (activated) NFC token.

5.2 PASSWORD ENCRYPTION

The core function of Hoverkey L1 is to provide secure password storage and retrieval. The password is encrypted and integrity protected alongside its metadata. When the password is required, the PEK stored in the NFC token is used to verify decrypt the protected passwords.

5.3 SECURE MESSAGING OVER NFC

The Global Platform (GP) specification supports secure exchange of APDU messages between the card and the terminal. GP supports three levels of messaging security:
  1. Entity authentication only
  2. (1) above plus integrity protection
  3. (2) above plus confidentiality protection.

Hoverkey L1 supports at secure level 3 messaging using the GP Secure Channel Protocol version 2 (SCP02).

5.4 PIN

In order to support an enhanced level of security, Hoverkey L1 supports the additional use of a PIN which is shared by all third-party Apps (as it is a PIN validated within token applet).

The user is required to set up a PIN at activation, but each third-party App may have their own policy on where a PIN is required for access.

The Sys Admin can enforce the requirement for a user PIN code (for all Apps) at activation via the configuration process.

6. SECURITY PROTOCOLS AND PROCEDURES

6.1 ACTIVATION

Figure 3:
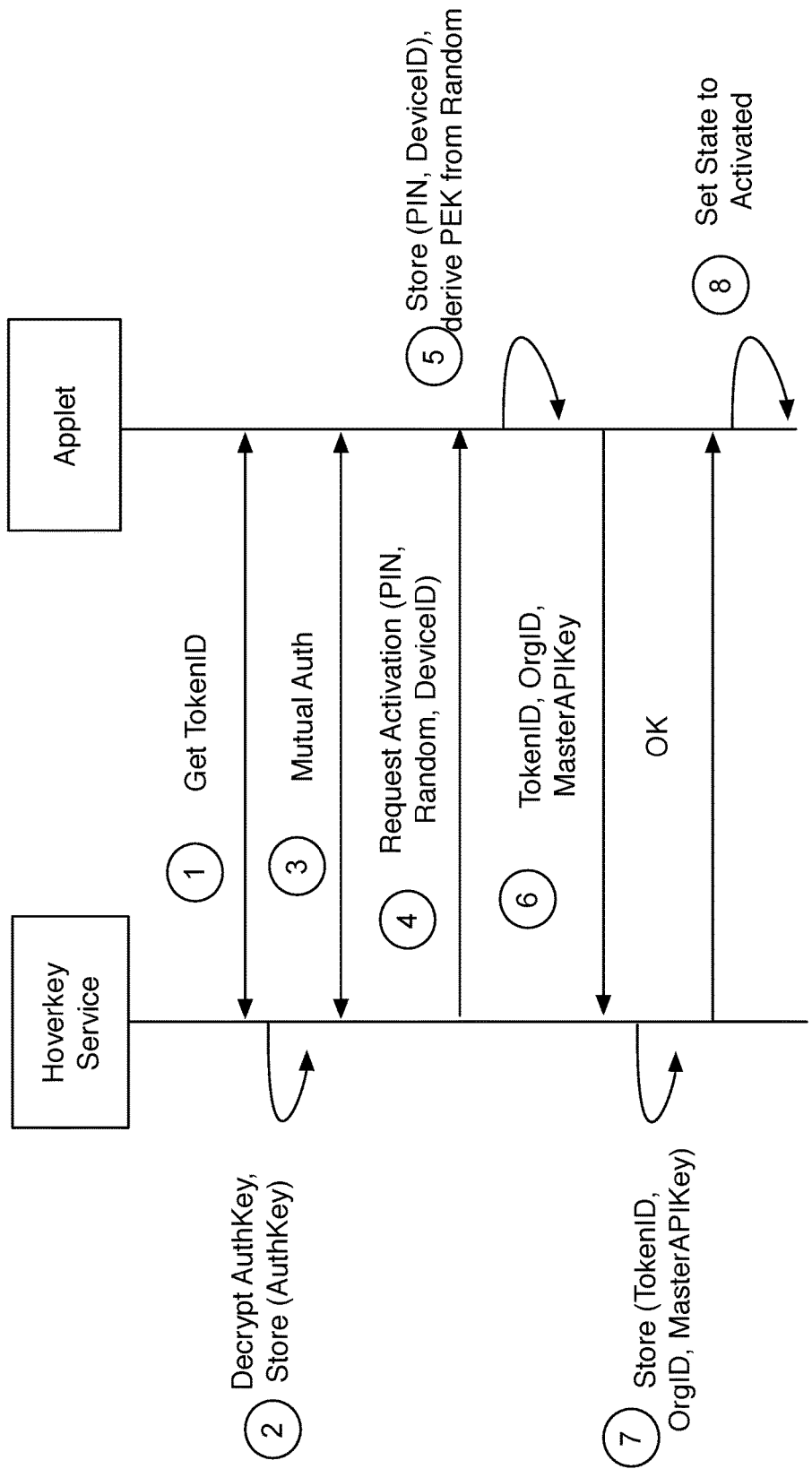
FIG. 3 shows the activation protocol.

FIG. 3 shows the activation protocol
Pre-conditions
AuthKey (plain or obfuscated) obtained from activation URL
Configuration data downloaded to Hoverkey Service via activation URL including:PIN requirement policies
  Co-branding data
  Report configuration
Applet is formatted with OrgID and MasterAPIKey and has not been activated Goals
Establish a shared authentication (pairing) key between Applet and Hoverkey Service
Generate and store Password Encryption Key (PEK) on token
Initialize User PIN
Transfer OrgID and MasterAPIKey to Hoverkey Service (for validation of Developer Apps)
Steps (referring to the corresponding numbers set out in FIG. 3).
1. Hoverkey Service queries token for TokenID
2. The AuthKey may be supplied in plaintext, or, for enhanced security, obfuscated with the TokenID.

a) If obfuscated, Hoverkey Service de-obfuscates (decrypts) AuthKey with TokenID (as shown in FIG. 3)
b) If in plaintext, Step 1 is omitted and Step 2 will only need to store the (plaintext) AuthKey
3. Service and Applet perform mutual authentication
4. Service sends activation request, supplying a random number, PIN and DeviceID
5. Applet stores PIN and DeviceID, and derives PEK from Random
6. Applet returns TokenID, OrgID and MasterAPIKey. These are stored by Hoverkey Service, along with RegKey after deriving from MasterAPIKey.
7. Service returns OK
8. Applet updates its status to Activated
9. Upon activation success, if the user has no more devices to pair with his token, he should delete the activation email (and any copies) from his mail account.

6.2 ADDING A NEW DEVICE

Figure 4:
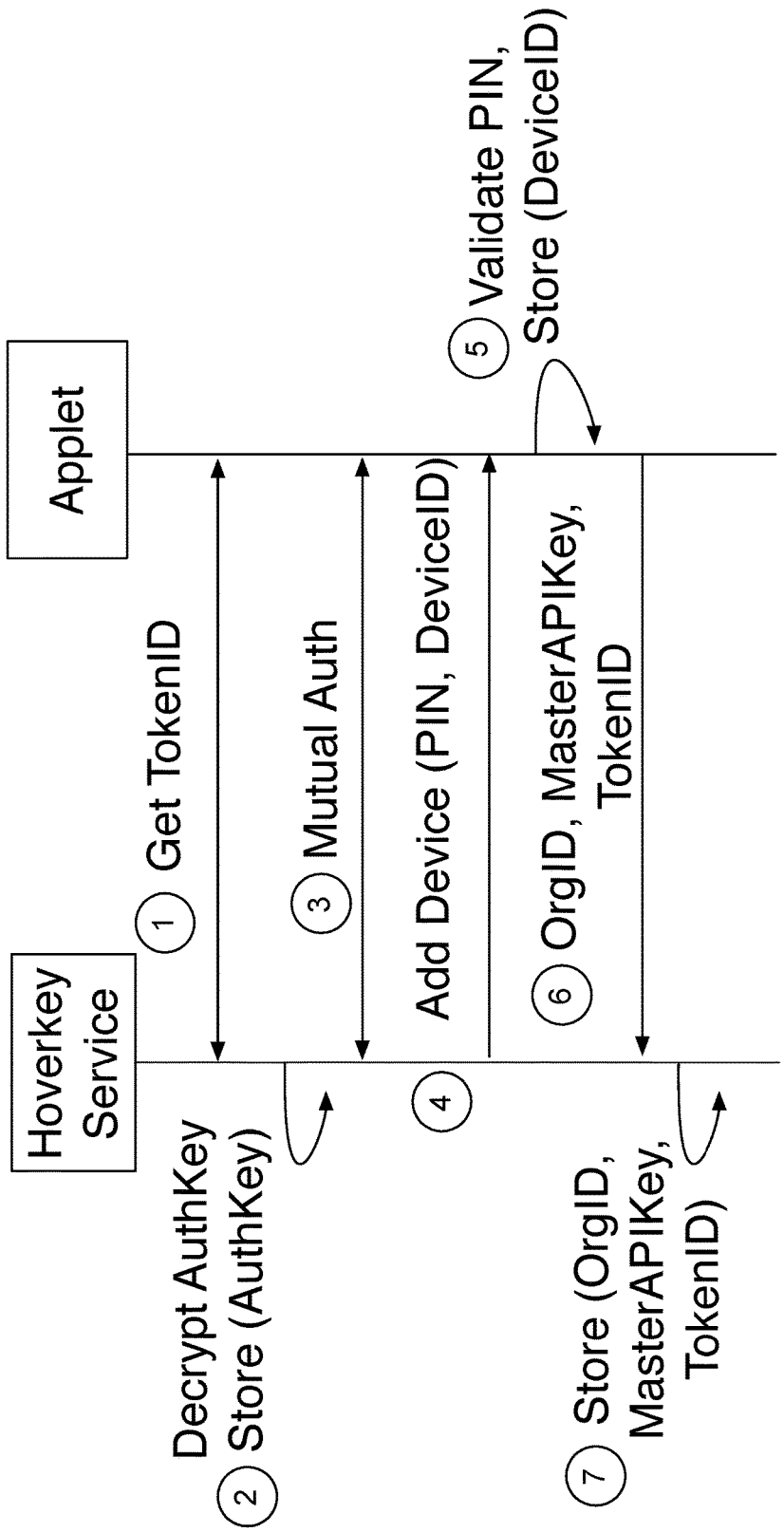
FIG. 4 shows the method of adding a new device to an activated card.

FIG. 4 shows the method of adding a new device to an activated token.
Pre-conditions
Applet has already been activated (by another device)
Goal
Transfer OrgID and APIKey to Hoverkey Service
Steps (referring to the corresponding numbers set out in FIG. 4)
1. Hoverkey Service retrieves AuthKey from link provided by activation email
2. Service mutually authenticates with (already activated) Applet
3. Service supplies a PIN to authenticate to Applet, along with its own DeviceID to be added
4. Applet validates PIN, stores DeviceID
5. Applet returns OrgID, MasterAPIKey and TokenID 6. Service stores OrgID and APIKey, along with RegKey after deriving from MasterAPIKey.
7. Upon activation success, if the user has no more devices to add to (pair with) his token, he should delete the activation email (and any copies) from his mail account.

6.3 APP REGISTRATION

The purpose of registration is for the third-party app to authenticate itself to the Hoverkey App, and at the same time to provide Hoverkey App with the user credentials for their secure storage.

Upon successful registration, Hoverkey issues the third-party app with its unique random APIKey for its subsequent Hoverkey API access (i.e. an APIKey even if compromised will be invalid on a different device).

There are two methods for app registration:
1. Asymmetric key method, primarily for public apps, i.e. those available from the App stores.
2. Symmetric key method, primarily for private apps, i.e. those developed in-house and distributed by non-public means.

Asymmetric Key Method

A public app developer wishing to integrate Hoverkey into their app must obtain a Registration Key (RegKey) in the form a certificate, which is embedded into the app prior to its public release. The certificate is issued by Hoverkey and signed with the Hoverkey private key. The corresponding public key is embedded in the Hoverkey App for verification of the app certificate. The idea is that the certificate attests to various attributes of the app (which need to be independently obtainable from the OS), thereby making it difficult for a malicious app to masquerade as genuine.

Attributes to be certified include (for Android app):

Its unique AppID (Package Name on Android whose uniqueness is guaranteed if downloaded from Play Store)

Symmetric Key Method

A private app, i.e. one not deployed through the public app store will employ a different registration scheme. Since the app developer may want to deploy their apps privately without Hoverkey involvement, we employ an alternative method which allows the developer to generate their own RegKey (based on symmetric keys).

Figure 5A:
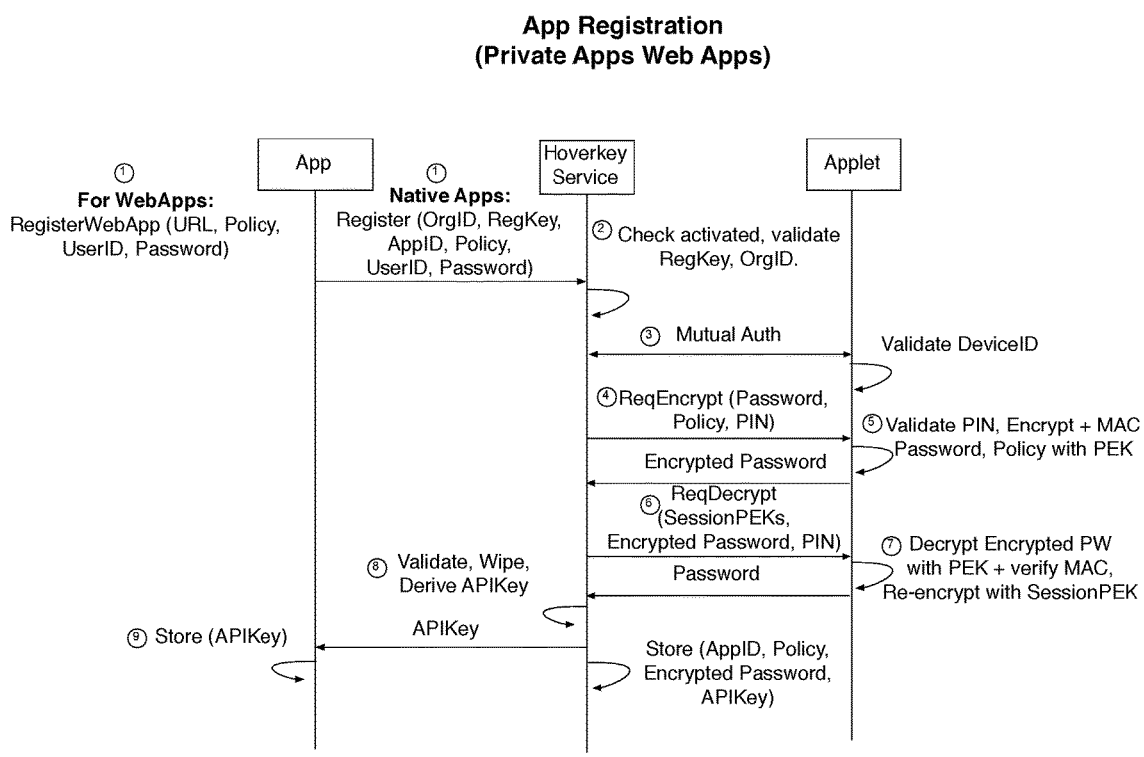
FIG. 5a shows the registration protocol for a private app web app.
Figure 5B:
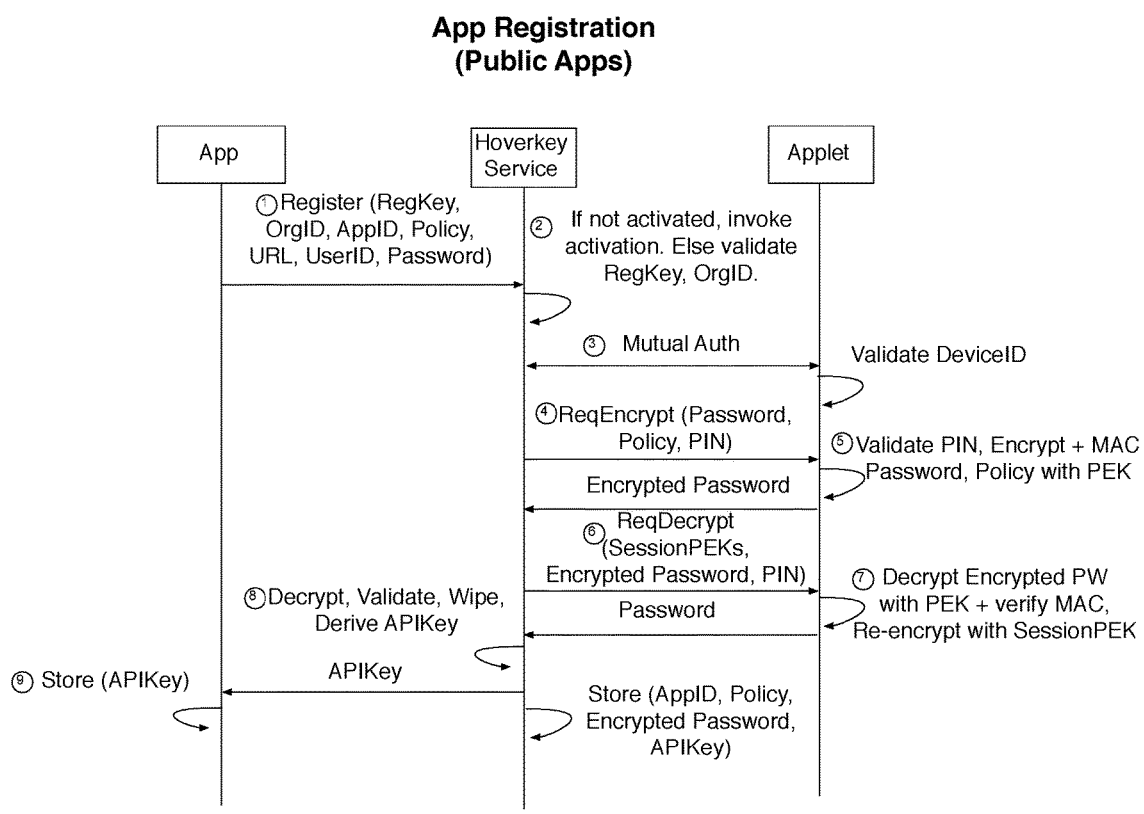
FIG. 5b shows the registration protocol for a public app.

FIG. 5 shows the registration protocol. FIG. 5a illustrates registration for a private app web app, and FIG. 5b illustrates registration for a public app. The same reference number apply to each.

Precondition
NFC Token has been successfully activated (if not activation will be invoked at Step 2)
Goals
Set up Hoverkey Service for use with this App
Create NFC-token-protected password with for use with Hoverkey Service
Steps (referring to the numbers set out in FIGS. 5a and 5b)
1. App registers itself with OrgID (private app only), APIKey, AppID, Policy and the User's password. In the case of a public app, the RegKey will be a digitally signed certificate. For a private app, the RegKey will be a pseudorandom byte string. Currently supported policies include:
   a) Whether PIN required for this App
2. Hoverkey Service checks whether it has been activated. If activated, it validates the
RegKey supplied by the app. For a public app, the RegKey is validated by the Hovkery App Reg Public Key. For a private app, the provided OrgID is checked and RegKey validated against that derived from MasterAPIKey.
3. Service performs mutual authentication with Applet. In addition, Applet validates the DeviceID supplied by Service.
4. Service sends request for password to be encrypted, along with policy and PIN for validation.
5. Applet validates PIN and encrypts the password and policy with the PEK
6. In order to validate successful encryption, Service sends a decryption request with the encrypted password, supplying a the Session PEKs (Session PEK_ENC and Session PEK_MAC) and optionally a PIN (as per policy).
7. Applet decrypts and returns the plaintext password, encrypted under the SessionPEK.
8. Service decrypts and verifies the plaintext password returned and returns success to the App.
9. Service saves the UserID, Policy and the encrypted password on the cloud storage server as AppID/DeviceID/credentials.dat.

6.4 PASSWORD RETRIEVAL

Figure 6:
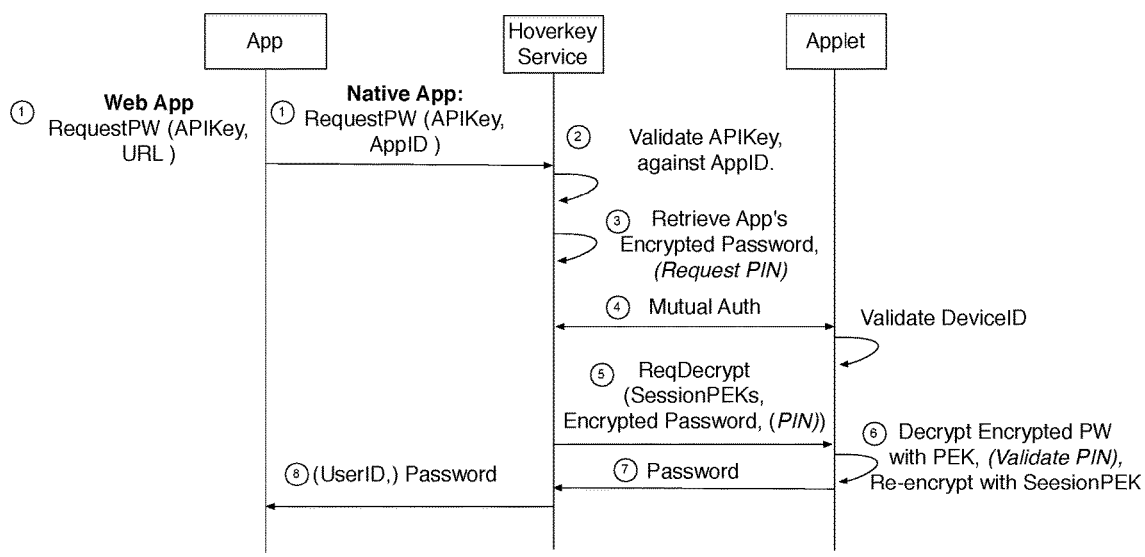
FIG. 6 shows the password access protocol.

FIG. 6 shows the password access protocol.
Precondition
App has registered itself with the Hoverkey Service and set up an encrypted password
The Applet is in Activated state
Goal
Retrieves the specified password that has been protected by the NFC token
Optionally, retrieves user ID (if stored)
Steps (referring to the number set out in FIG. 6)
1. App sends request password command, supplying APIKey, AppID.
2. Hoverkey Service validates the request
3. Service obtains the App's UserID, Policy and encrypted password by retrieving the file AppID/DeviceID/credentials.dat from the cloud storage, then requests a PIN from user if required by Policy.
4. Service mutually authenticates with Applet. In addition, Applet validates the DeviceID supplied by Service.
5. Service sends the encrypted password to Applet for decryption, supplying session keys (Session PEK_ENC and Session PEK_MAC), and optionally a PIN (as per policy).
6. Applet authenticates and decrypts the input, and validates the PIN if required.
7. Applet returns the plaintext password encrypted under the Session PEK and integrity protected with Session PEK_MAC
8. The password is decrypted and returned to the App.

6.5 CHANGING PASSWORD FOR APP

To change the password for an App, Hoverkey services simply replaces the existing encrypted password with a new one, with the following steps:
 1. Mutual authentication, Applet validates DeviceID
 2. Requires PIN
 3. Service sends new password and policy
 4. Applet returns encrypted password

6.6 CHANGING PIN

To change the token PIN, the following steps are followed:
 1. Mutual authentication, Applet validates DeviceID
 2. Requires old PIN,
 3. User enters new PIN (twice)
 4. Applet stores new PIN

6.7 DEREGISTER APP

Remove the following information for the App:
(Hoverkey token not required)
 1. AppID
 2. Any encrypted password(s)
 3. Any saved user name(s)
 4. Policy

6.8 REVOKING NFC TOKEN

If the token is lost, perform once by each associated device:
(The Hoverkey token not required)
Wipe authentication key from Hoverkey App
Wipe all encrypted passwords
Reset Hoverkey app to pre-activated state The Hoverkey App also downloads a list of revoked Token IDs periodically, which allows it to revoke the token if an entry matches the one that it is paired with.

6.9 LIST DEVICES

Can be performed
 by any paired device
  mutual auth, Applet validates DeviceID, or mutual auth with Admin Key
 Or after mutual auth with Admin Key
No PIN required
Applet returns list of associated Device IDs

6.10 REVOKING A DEVICE

Usually takes place after List Devices—as Hoverkey App is not expected to remember the device ID list
Can be performed from any paired device
Mutual auth, Applet validates DeviceID
Requires PIN
Removes DeviceID from Applet

6.11 PIN BLOCKING

Within the Applet, the User PIN has an associated PIN Tries Remaining (PTR) value, initialized to a specified number.
The Applet also has a fixed number (5) Personal Unblocking Keys (PUK) of 8 digits, labelled PUK1, PUK2 etc, which are randomly generated and loaded at formatting. A copy of the PUKs for each token is provided to the Sys Admin. The Applet maintains a single Unblocking Tries Remaining (UTR) value, initialized to a specified number.
Each time the PIN is successfully validated, PTR is reset to its initial value.
Each time an incorrect PIN is detected, PTR is decremented by one.
If PTR reaches zero, the User PIN is blocked. The Applet also returns to the Service which PUK the user should use to unblock the PIN, and tries remaining for that PUK.
In order to unblock and reset the PIN, the user must request his PUK code from SysAdmin as indicated by within PIN blocked UI or by retrieving applet status (see Section 0). If this is the first time the User unblocks the PIN, he will request the PUK1 code; the second time will require PUK2 etc., i.e. each PUK code can only be used once.
If the User's PUK codes are exhausted, as soon as PTR reaches zero again, the Applet is blocked. The NFC token must be replaced.
Each time a PUK is entered incorrectly, the UTR is decremented. If UTR reaches zero, the Applet is blocked. The NFC token must be replaced.

6.12 GET APPLET STATUS

Can be performed from any device
If not authenticated
 Applet returns TokenID, Applet State
If authenticated (with Auth Key or Admin Key)
 If in Formatted State: returns TokenID, Applet State, PIN Tries Remaining Counter=Max, current PUK index, current PUK Tries Remaining counter. (this may not be max since applet may have been reset to formatted, which does not reset PUK status, i.e. used PUKs remains used). The current PUK index is the index of the PUK code the use should ask for if the current PIN becomes blocked.

If in Activated State: returns TokenID, Applet State, PIN Tries Remaining Counter, current PUK index, PUK Tries Remaining counter=Max If in PIN Blocked State: returns TokenID, Applet State, PIN Tries Remaining Counter=0, current PUK index, PUK Tries Remaining counter If in Blocked State: returns TokenID=0, Applet State

6.13 ADMIN FUNCTIONS

All functions within this section require mutual authentication with Admin Key.

6.13.1 Reformat Token

In order to re-format the token (e.g. for issuing to a new user)
Mutual auth with Admin Key
Send reformat command to:
  Remove existing User PIN (and reset retry counter)
  Remove existing password protection keys PEK_ENC, PEK_MAC
  Reset applet to FORMATTED state
  (Does not reset PUKs—used PUKs remains used)

6.13.2 PIN Reset

In order for the Sys Admin to reset the PIN,
Mutual auth with Admin Key
Send PIN reset command with the user's new PIN
(Does not require PUK)

6.14 EMERGENCY ACCESS

6.14.1 Lost/Defective NFC Token

For emergency online access, the user may simply login manually with his password. If the user does not know/remember his password (due to the use of a complex password, for example), the application's password reset facility may be used to set a new password (and also change the Hoverkey protected password).

6.14.2 Forgotten/Blocked PIN

If an App's policy requires a PIN which the User does not remember, he could:
  Try different PINs until PIN Blocked (if not already) and request a PUK from the Sys Admin to Unblock and reset the PIN,
  Log in manually if he remembers the user ID and password (although he will have to either recall or reset the PIN eventually to continue using Hoverkey L1).

6.15 SYNCHRONISING CREDENTIALS BETWEEN DEVICES

Preconditions:
User has devices with IDs DeviceA and DeviceB respectively
The user's token has been activated and ready for use for both devices The user has registered an app with an ID AppX on DeviceA
AppX has not been registered on DeviceB Goal:
AppX credentials for the user becomes available for use on DeviceB Steps
1. On DeviceB, AppX registers itself with Hoverkey Service using either the symmetric key or asymmetric key method, but without supplying the user's credentials.
2. Service retrieves the file AppX/DeviceA/credentials.dat from the cloud storage
3. Service uploads the same file, unaltered, as AppX/DeviceB/credentials.dat
4. The credentials are now ready for use on DeviceB

7. CRYPTOGRAPHIC SPECIFICATION

7.1 KEY MANAGEMENT

For security purposes, keys used for encrypting and integrity-protecting user passwords for storage (generated by the applet at activation) never leave the applet (nor the physical token). Session keys are also used (generated by the Hoverkey App) for encrypting and integrity-protecting passwords over NFC after decryption. These are wiped immediately after use.

7.2 PASSWORD STORAGE ENCRYPTION PROCESS

Figure 7:
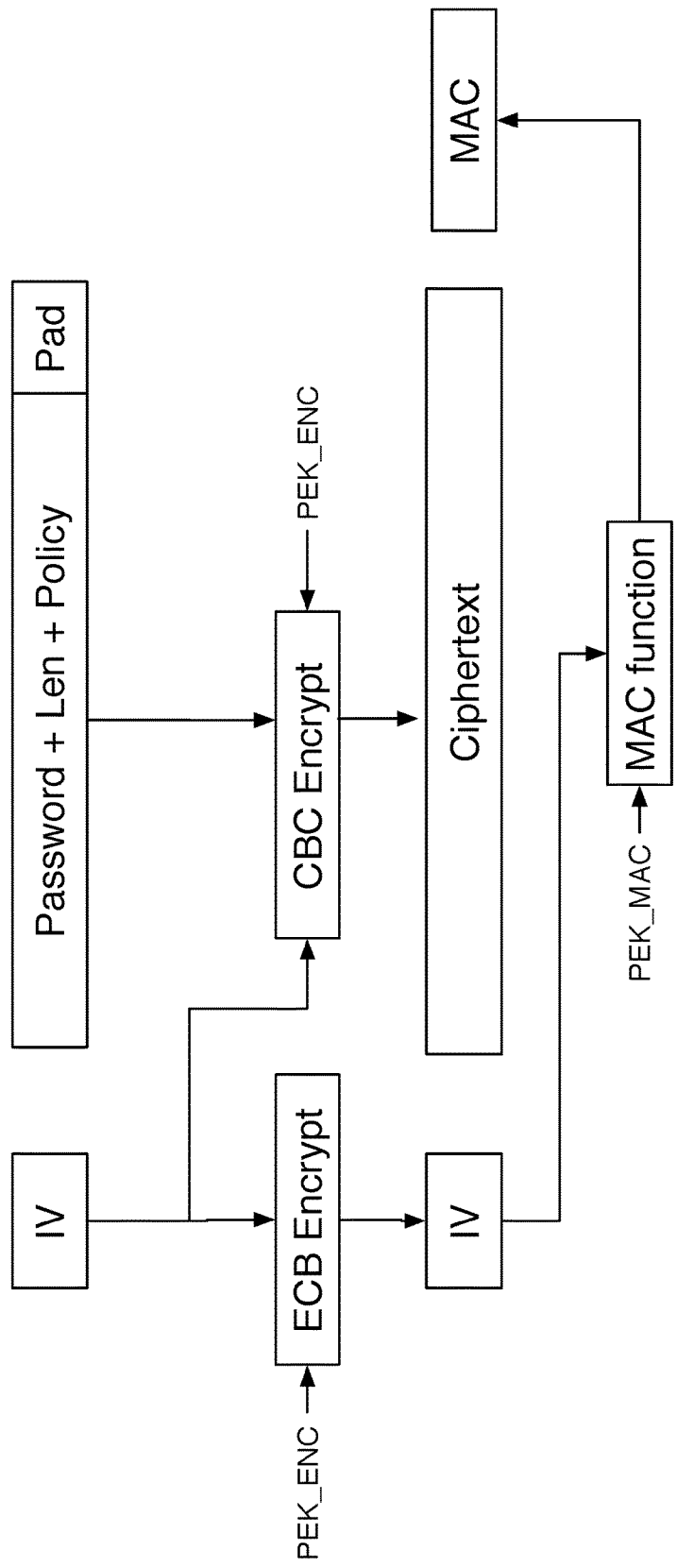
FIG. 7 shows the password encryption process.

FIG. 7 shows the password encryption process.
Encrypting password for storage, to be performed by the applet.
  a) Combine policy, length of password and password itself received from device, apply padding to align with encryption block length
  2. Generate a random Initialization Vector (IV) of encryption cipher block length
  3. Encrypt block generated in Step 1 in CBC mode using IV from Step 2, using Key PEK_ENC
  4. Encrypt the IV with PEK_ENC in ECB mode
  5. Calculate a MAC on (output from Step 4+output from Step 3) using a hash based MAC (HMAC) with the key PEK_MAC
  6. (Output from Step 5+output from Step 3+MAC from step 4) is returned to device for storage

7.3 PASSWORD RETRIEVAL (SESSION) ENCRYPTION PROCESS

Figure 8:
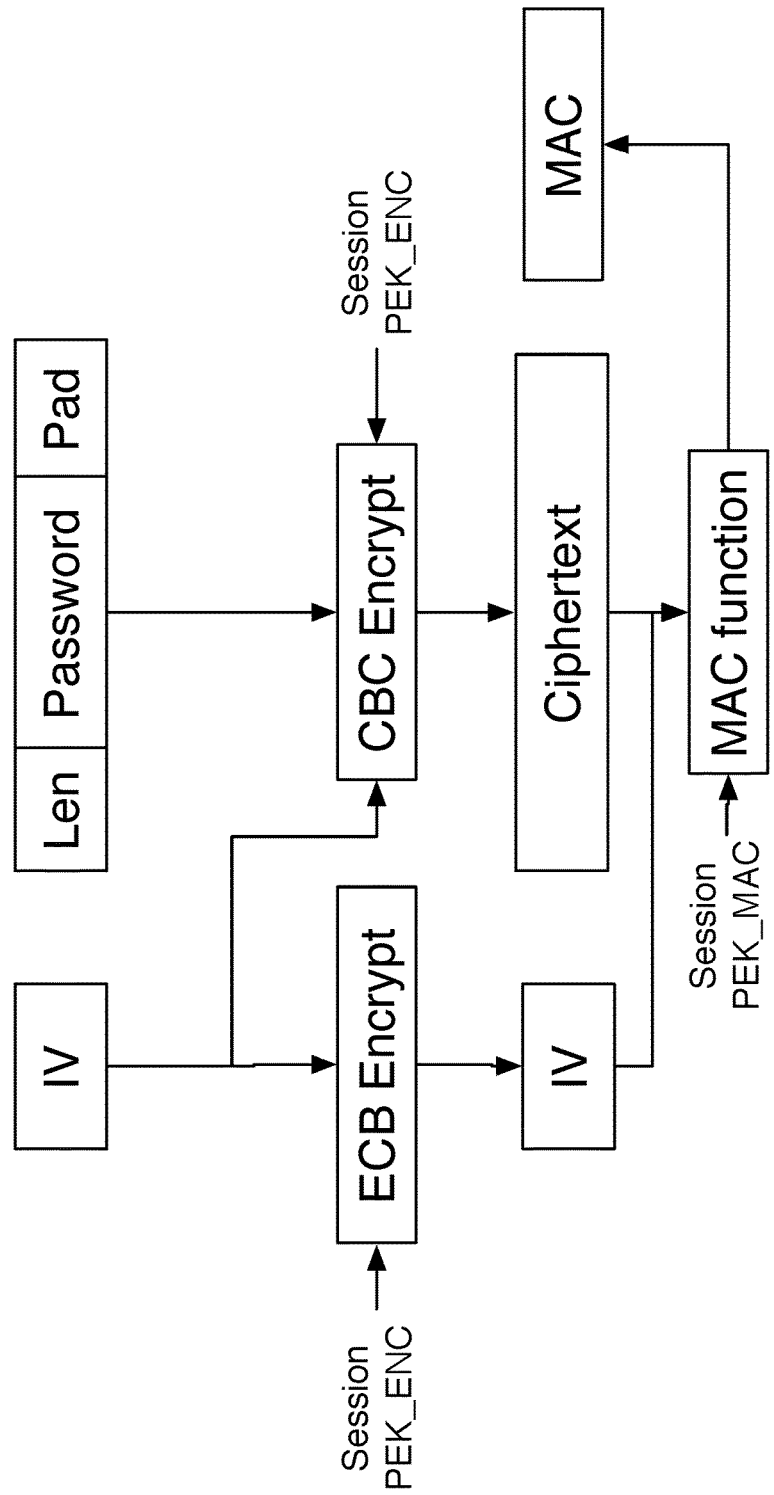
FIG. 8 shows password retrieval encryption.

FIG. 8 shows password retrieval encryption.
To be performed by applet, after verification of the MAC, decryption of the encrypted object supplied by device, and validation of the policy field.
  1. The plaintext password is left padded with a two-byte length field, and right padded with random bytes to make the largest allowable block (fits within an R-APDU) whose size is a multiple of the cipher block length
  2. Steps 2-5 as per the Password Storage Encryption Process, except that Session_PEK_ENC and Session_PEK_MAC are used for encryption and integrity protection instead.

7.4 APP REGISTRATION KEY DERIVATION HIERARCHY (SYMMETRIC KEY)

Figure 9:
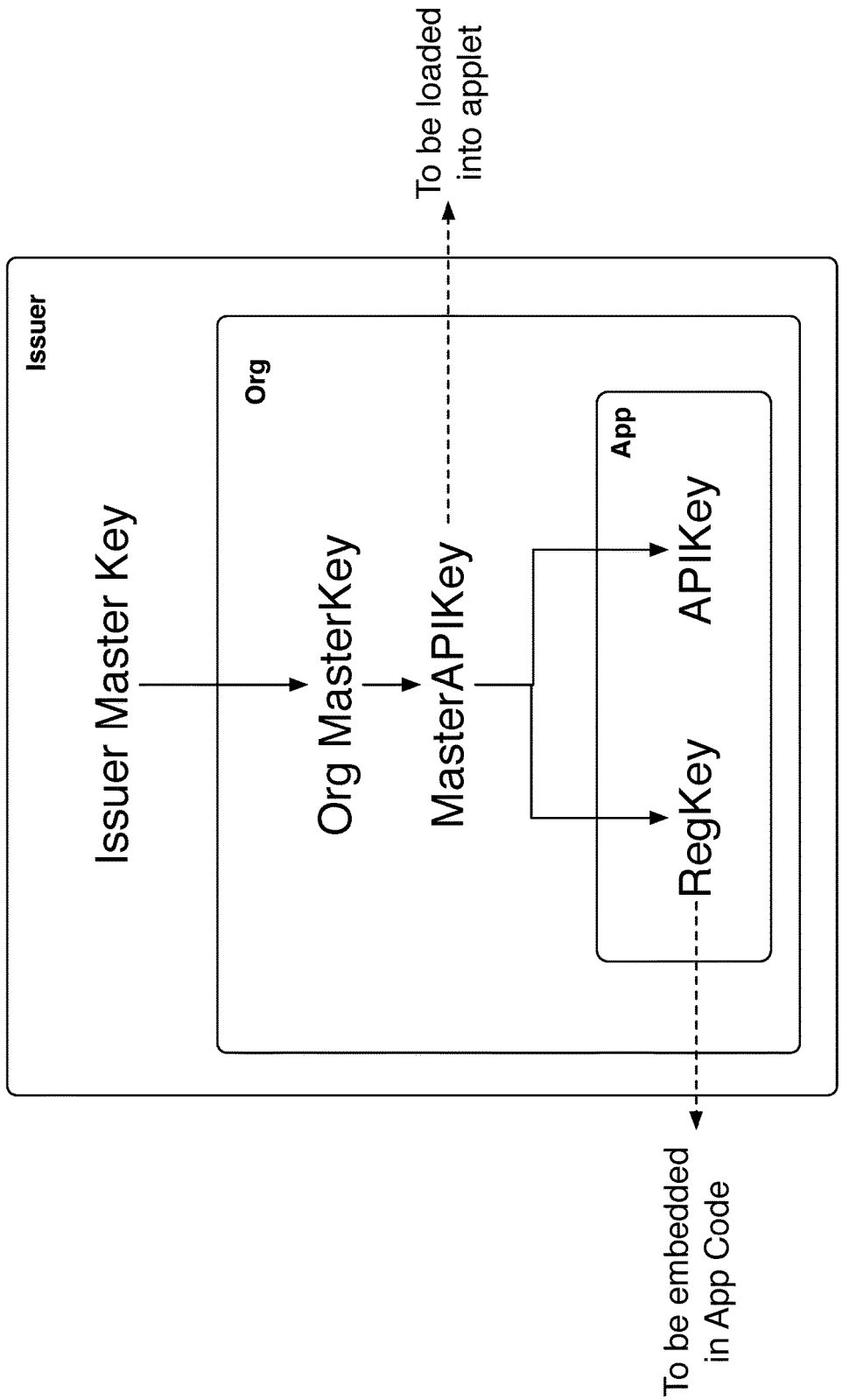
FIG. 9 shows the key hierarchy.

FIG. 9 shows the key hierarchy. Keys are derived using the HMAC-Based KDF with as described in NIST Special Publication 800-108, [: L. Chen, *Recommendation for Key Derivation Using Pseudorandom Functions* (Revised), NIST SP 800-108, October 2009, available from http://csrc.nist.gov/publications/nistpubs/800-108/sp800-108.pdf. This document is incorporated by reference.

Issuer Keys
IssuerMasterKey=Random bytes generated by secure RNG
Org Keys
OrgID=Assigned unique OrgID
AppID=(globally) unique app identifier

8. HOVERKEY APPLET STATUS

Figure 10:
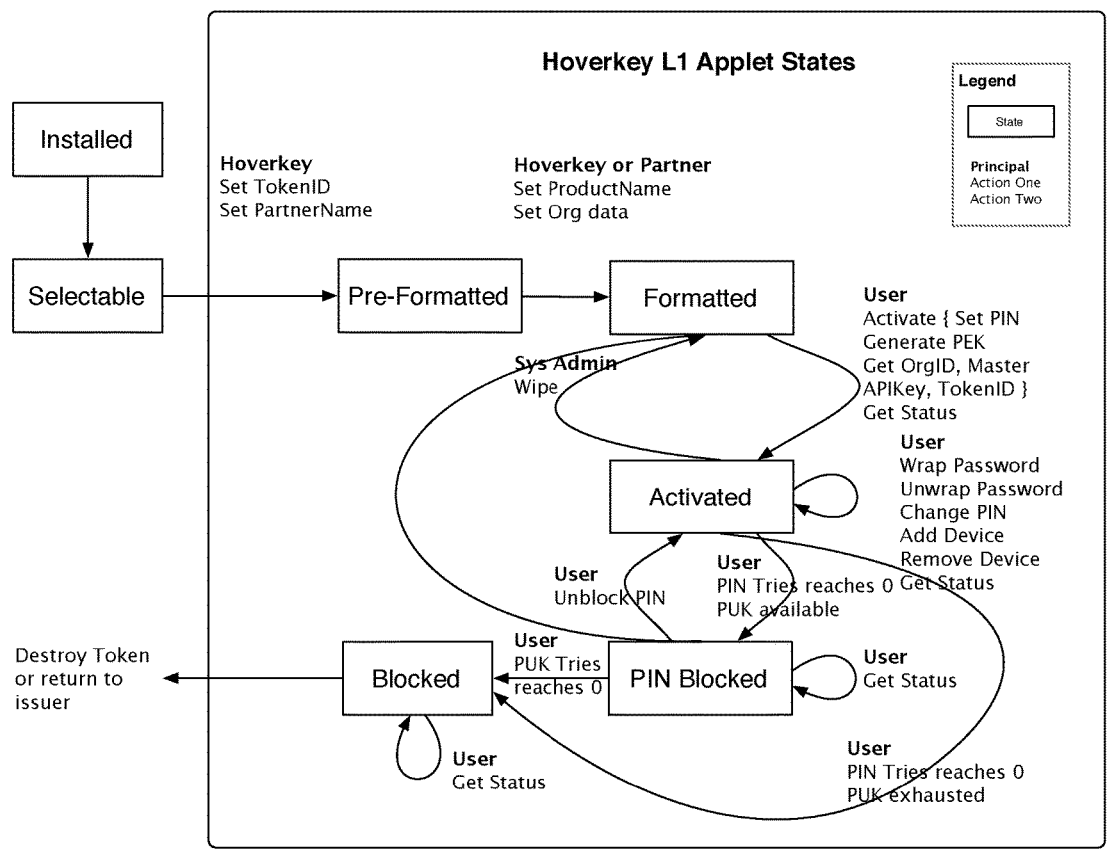
FIG. 10 shows the applet states, and their sequencing.

FIG. 10 illustrates example applet status values, and their sequencing.

| State | Description |
|---|---|
| Installed | Applet is installed but not yet selectable |
| Selectable | Applet is now selectable and now ready to be personalized. |
| Formatted | Personalization step 1: Hoverkey (or a trusted third-party) has generated and loaded OrgID, APIKey, Auth Key, Admin Key and PUKs. Admin may reset activated cards to this state. All data objects are reset except for any PUKs that have been used. |
| Activated | Personalization step 2: Token delivered to User who has also received his personalized activation email. He has followed the instructions to activate the token and set the PIN. The Applet is now ready to be used operationally. Additional devices may be added at this point. |
| PIN Blocked | If the User's PIN tries remaining counter reaches zero (with at least one unused PUK remaining), the Applet enters this state and will not perform the core functions until it's unblocked with a PUK |
| Blocked | If PUK tries counter reaches zero or PIN tries counter reaches zero with no more PUK remaining, the Applet becomes locked. The token must be revoked, then it may be destroyed or sent back to Hoverkey |

9. GLOSSARY

| Term | Definition |
|---|---|
| Applet | Software program running on a smart card supporting Global Platform and card (e.g. Java Card) specifications |
| Application Protocol Data Unit (APDU) | Basic communication messages between a smart card and the terminal (reader) |
| App Registration | Validation of a third party app by Hoverkey at first use and issuance of API key for subsequent access |
| Bluetooth/BLE | A set of wireless communication standards designed for short-range data exchange between devices. Typically used by small personal devices to create a Personal Area Network. Bluetooth Low Energy (BLE) is a Bluetooth standard which allows low-power devices which only communicate intermittently to consume a fraction of the power required by normal Bluetooth. |
| Customers | The person or organization responsible for day-to-day management of Hoverkey tokens. In particular, they are responsible for sending out activation emails and, when a user requires PIN unblocking, authenticating the user and issuing PUK codes. When selling directly to End Users, Hoverkey will in effect play the role of the Customer. |
| Developers | Developers of mobile applications, especially those who embed Hoverkey functions into their apps |
| DeviceID | A unique identifier for a mobile device (or one that is highly likely to be unique) |
| Developer Apps | Developers may enhance the security of their existing mobile applications by creating a Developer App, using the Hoverkey iOS and Android or other types of code libraries. |
| End User (or User) | A members of a Customer organization who uses Hoverkey-enabled applications |
| Emergency Access | An optional service which allows access to Hoverkey-protected services without a functioning NFC token using a pre-specified back-up authentication method. |
| Global Platform | An organization responsible for specifying standards for smart card application (i.e. applet) management |
| Hoverkey L1 App | An application installed and run on the User's mobile device providing Hoverkey Service and management functions |
| Hoverkey Component | Software component provided by Hoverkey for integration into third-party Apps |
| Issuer Partner | An organization with an established relationship with Hoverkey to issue Hoverkey tokens to their Customer |
| Personal Identification Number (PIN) | A sequence of digits which is kept secret by the user for authentication to the NFC Token |
| System Administrator (Sys Admin) | Typically the person in the Customer organization who is responsible for implementing IT security policies and will have influence over any security product that may be selected by the organization. They have a technical skillset. They may also take the role of User Administrator (see below) in small deployments. |
| Token Activation | The process by which an End User sets up the first use of his NFC token |
| Token Formatting | The process by which blank smart cards are prepared for the Customer |

| Term | Definition |
| --- | --- |
| User Admins | This is the person in the Customer organization who is responsible for the operating the IT security systems. |

10. OPERATIONS USING CRYPTO-CURRENCIES

Cryptocurrencies such as BITCOIN are now widely used for commercial transactions, especially in the online setting. User authorization keys for cryptocurrencies such as BITCOIN typically are stored in a wallet, which is a digital file that stores private signing keys so that they can be used to authorize a transaction with a seller. When a consumer uses BITCOIN as a payment mechanism, there is a need to secure the consumer's BITCOIN wallet. There are several different ways that a BITCOIN wallet can be implemented, each with different advantages and disadvantages.

Paper wallets, which involve printing the user's BITCOIN address and private keys on a piece of paper, are secure against malware including viruses, Trojan horses, and key loggers, as long as the BITCOIN keys are generated with secure equipment. They are secure against online theft initiated by hackers or unscrupulous employees and owners of online wallets. However, they are difficult to set up, and are not secure against physical theft.

An offline computer or device can be used as a BITCOIN wallet. These are somewhat secure against malware, as long as the BITCOIN keys are generated with secure equipment. They are secure against online theft initiated by hackers. Once set up, they are easy to maintain. However, it is initially difficult to securely generate the keys with an audited or clean computer that is free of security threats. Further, this is a more expensive and less reliable solution than a paper wallet, since it needs a separate computer or device. As a result, the wallet will need to be backed up. Additionally, there are risks of infection by malware, arising via communication through USB ports or network ports, if the device is not properly secure.

Dedicated hardware wallets, such as the TREZOR wallet, offer another possible solution. They are secure against malware, so long as the device has not been tampered with. They are secure against online theft. Once set up, they are easy to maintain. Secure transactions that are more highly assured can be completed with private keys generated on the hardware wallet itself rather than imported from a less trusted computer. However, they require manual backup and are relatively expensive compared to other solutions. The limited memory of some dedicated hardware makes it infeasible to store a large amount of transaction-related information in the wallet. Moreover, products such as TREZOR typically are single-purpose devices, i.e. they are not readily provisionable with additional credentials for non-BITCOIN uses such as online banking or email account login.

Multi-signature hot wallets and services make it easier to carry out secure transactions without needing to import private keys, offering added features such as strong two factor authentication and online access. Some services of this type, such as COINBASE, offer insurance against theft of users' BITCOINs. They are relatively easy to set up and maintain, but are vulnerable to malware such as Trojan horse programs that are present within the browser at the time of creation. There are also concerns that private keys generated with these services can be also stored and captured by companies.

An alternative solution is a combination multi-signature paper and electronic wallet, exemplified by the ARMORY system. This is secure against malware, as long as the keys are generated with secure equipment, and secure against online theft. Once set up, it is easy to maintain. It offers the advantage of low cost, and is secure against physical theft so long as only one of the private keys is physical and the other two are encrypted and stored independently. However, they are initially difficult to securely generate with an audited and clean computer.

The technology disclosed herein offers several advantages when used to secure BITCOIN wallets. Firstly, it offers a convenient and familiar user experience, similar to the chip and PIN system that is in widespread use with traditional, centralized card payment systems, or to biometric authentication methods found on recent mobile devices. Second, it is easy to set up for the consumer. Third, it is easy to back up to the cloud, whilst retaining a high level of security. Finally, because users' BITCOIN private keys are stored on a dedicated hardware security device, which can be a smartcard, or a wearable device, and which is often not connected to the internet, it is relatively secure against malware including viruses, Trojan horses and key loggers.

In all embodiments of this disclosure, the term BITCOIN is used for convenience to refer to a particular cryptocurrency that may be familiar to the reader. However, the techniques herein may be used with any cryptocurrency that relies on secure management of the user's private key. Therefore, all use of the term BITCOIN in this disclosure are intended to refer broadly to any cryptocurrency.

FIG. 11 illustrates a computer system that is programmed to provide secure storage of cryptocurrencies. In general, the system of FIG. 11 is programmed to set up, on a mobile computing device such as a smartphone, a wallet that has been encrypted with a secret known only to a separate token card device, but that can be verified by both the token card and a smartphone app if the PIN entered on the token card device is correct. Consequently, the smartphone storing the encrypted wallet is useless if it is stolen alone. To use the smartphone, a user or thief must have the token card device, or be able to emulate its algorithms and message protocol provided the secret on the token card device also was known, and also know the PIN.

In one embodiment, the system is programmed to provide a method of conducting a cryptocurrency payment via a mobile computing device comprising, using the mobile computing device, storing an encrypted wallet received from a portable security token that is separate from the mobile device, wherein the encrypted wallet comprises a cryptocurrency wallet encrypted with a secret key that is restricted to the portable security token; using the mobile computing device, receiving a cryptocurrency payment instruction; using the mobile computing device, prompting for a user credential to approve the cryptocurrency payment instruction; using the mobile computing device, sending, to the portable security token, a message in response to receiving the user credential, wherein the message comprises the encrypted wallet, the cryptocurrency payment instruction, and the user credential; and wherein the sending of the message causes the portable security token to: decrypt, using the secret key, the cryptocurrency wallet from the encrypted wallet; in response to confirming that the user credential matches an authentication identifier registered with the portable security token, create a cryptocurrency payment transaction by digitally signing the cryptocurrency payment instruction using the cryptocurrency wallet; transmit the cryptocurrency payment transaction to a cryptocurrency network or cryptocurrency bank or exchange; and erase the cryptocurrency wallet. The intermediary may be a merchant or bank, or communications may be directly via a home PC. In various embodiments, confirming that the user credential matches an authentication identifier registered with the portable security token comprises using any of PIN, biometric or fingerprint on the mobile device, or authentication via button press confirmation, PIN or fingerprint on the portable security token. The wallet can have integrity protection as well as encryption.

In one embodiment, the encrypted wallet is stored on a remote cloud storage location. In an embodiment, the authentication identifier is one of a personal identification number (PIN), a biometric identifier such as a fingerprint. In an embodiment, receiving the encrypted wallet is in response to sending, to the portable security token, an encryption request that embeds the cryptocurrency wallet. In an embodiment, receiving the encrypted wallet is in response to sending, to the portable security token, an encryption request to create the cryptocurrency wallet as a new wallet.

In an embodiment, the cryptocurrency payment instruction is received from one of: an application executing on the mobile device, an application executing on a separate computing device owned by a user of the mobile device, and a merchant terminal. In an embodiment, the cryptocurrency payment instruction is received using one of: a cryptocurrency exchange application program interface (API), one or more near field communication (NFC) messages, and cellular or wireless Internet access.

In an embodiment, receiving the encrypted wallet from the portable security token and the sending of the message to the portable security token utilize near field communication (NFC).

In an embodiment, the prompting is by outputting, on a display, a price, a product, and a merchant associated with the cryptocurrency payment instruction.

In an embodiment, the cryptocurrency payment transaction is transmitted to the cryptocurrency network by communicating with one of: a separate computing device owned by a user of the mobile device, a merchant terminal, and a cryptographic currency exchange. In various embodiments, the portable security token is one of: a wearable device, a watch, a card, and a ring. In one embodiment, the cryptocurrency wallet is a BITCOIN wallet.

In one embodiment, a computer system 1100 comprises:
A token card device 1102 comprising memory programmed to store a secret value 1104; for convenience in this disclosure the token card also may be termed a Hoverkey card but the label "Hoverkey" is not required in any embodiment. The token card device 1102 also features a keypad 1103, such as a numeric or alphanumeric keypad, and a PIN 1105 stored in memory. Some embodiments may omit the keypad 1103. There also may be a display, such as an embedded LCD display, with appropriate display driver circuitry and/or firmware.

A mobile computing device 1106 that is programmed with an app 1108 that contains a secure storage library 1110 (or Hoverkey library). In various embodiments, the mobile computing device 1106 may comprise a smartphone, smart watch, bracelet, badge or other wearable apparatus, card, tablet computer, phablet computer or other mobile computing device. For purposes of convenience in this disclosure the term "phone" or "smartphone" may be used but that label is not required in any embodiment.

Payment instructions are generated by one of the following:
Mobile phone app 1108;
Home user personal computer 1140;
Merchant point of sale (POS) system 1130.

The mobile phone app 1108 is connected to a cryptocurrency network 1150, such as the BITCOIN network ("blockchain"), via the home user PC 1140, or via a cryptocurrency exchange 1120 or BITCOIN "bank" (e.g. COINBASE).

The merchant POS 1130 can be directly connected to the cryptocurrency network 1150, or via the cryptocurrency exchange 1120.

The system of FIG. 11 is programmed to use the infrastructure described in previous sections, with smartcard software that is programmed to support generation of cryptocurrency wallets and signing of transactions. In one embodiment, secure fingerprint support uses longer PINS or passphrases. The system of FIG. 11 is programmed to support the following functions.

1. The token card device 1102 can sign transactions (such as those used by BITCOIN) using ECDSA.
2. The token card device 1102 can securely store user secrets
3. The token card device 1102 has a mechanism to verify the user (e.g. PIN)
4. The token card device 1102 can generate random bytes securely.

As seen in FIG. 11, elements of the system are programmed to store keys and secrets in different locations in non-volatile storage such as electronic digital computer memory.

In one embodiment, a secret value 1104 is stored internally in the token card device 1102 and used to encrypt blob stores such as a cryptocurrency wallet 1112 of mobile computing device 1106.

In an embodiment, an encrypted cryptocurrency wallet 1112 is stored in memory of the mobile computing device 1106 under control of the mobile phone app 1108. Alternatively, the encrypted cryptocurrency wallet 1120 is stored in cloud storage at a location that is configured with the app 1108. In an embodiment, the encrypted cryptocurrency wallet 1120 is not left "at rest" in unencrypted form, and is only ever decrypted by the token card device 1102, used to sign a single transaction, then cleared from memory.

In an embodiment, a fingerprint secret 1114 is stored in a secure enclave of the mobile phone. The fingerprint secret 1114 is transmitted to the token card device 1102 on initial setup and subsequently on authentication. The token card device 1102 also stores a copy of the secret 1114, or a hashed derivative of it, to allow verification.

In an embodiment, a personal identification number (PIN) 1105 is stored only in the token card device 1102, in hashed form or other secure format. As described below, the PIN 1105 is transmitted to the token card device 1102 on initial setup and subsequently on authentication.

Embodiments are programmed to execute authentication methods as stated in the following algorithms. Each of the algorithms described herein may be programmed using a human-readable programming language such as JAVA, OBJECTIVE-C, C++, C and the like to produce machine-executable instructions that may be downloaded and installed into the mobile computing device 1106 or installed in firmware of the token card device 1102.

1. PIN 1105
   - The PIN is requested directly from the user initially on pairing, then subsequently when authentication is required.
   - The PIN is transmitted to the token card device 1102 and verified internally.
   - The PIN locks out after a fixed number of attempts.
2. Fingerprint secret 1114
   - In an embodiment, the fingerprint secret 1114 may be implemented internally using PIN mode; an internal PIN is generated on pairing, then secured using device specific API, such as the iPhone keychain. In an embodiment, the internal PIN is much longer than a traditional PIN.
   - The fingerprint secret 1114 is transmitted to the token card device 1102 in the same way as an ordinary PIN.
   - Losing the mobile computing device 1106 results in losing the fingerprint secret. Therefore, users may be advised to pair more than one device to the token card device 1102.

Pairing of the token card device 1102 may be executed using programs that implement the following algorithm.

1. The user installs the app 1108 on the mobile computing device 1106 and selects one or more authentication methods (fingerprint, PIN, etc). A setup process for those authentication methods is performed as described above.
2. The user is prompted to swipe the token card device 1102 using a near field communication (NFC) swipe operation.
3. The token card device 1102 is now paired to phone.
4. User can pair additional mobile computing devices, if required, by repeating the procedure.

Generating the wallet 1112 may be executed using programs that implement the following algorithm.

1. The user selects a "generate wallet" option on their mobile phone app 1108, and is instructed to swipe their token card device 1102; the app 1108 generates a "generate wallet" instruction which is emitted using the NFC interface.
2. The token card device 1102 receives a "generate wallet" instruction, generates an ECDSA wallet 1112, encrypts the wallet 1112 with the internal secret 1104, and transmits the encrypted wallet (as a "blob") with a public key to the mobile computing device 1106. In some embodiments, the wallet 1112 may be any form of cryptocurrency wallet or cryptocurrency keypain.
3. The mobile computing device 1106 stores the blob and public key, and displays the public key to user.
4. The user can sync the blob to the cloud if required or useful.

Importing the wallet 1112 from another location may be executed using programs that implement the following algorithm.

1. User selects "import wallet" instruction on the app 1108, and is instructed to swipe their token card device 1102.
2. The token card device 1102 receives an "import wallet" instruction which includes the unencrypted wallet 1112, encrypts the wallet with the internal secret 1104, and transmits the encrypted wallet (e.g., as a "blob") to the mobile computing device 1106.
3. The mobile computing device 1106 stores the blob and the public key, and displays the public key to the user. The mobile computing device 1106 instructs the user that they can now destroy unencrypted wallets.
4. The can sync the blob to the cloud if required or useful.

An example merchant POS transaction may be executed using programs that implement the following algorithm.

1. Merchant instructs the POS computer 1130 to charge the user a particular amount denominated in cryptocurrency for a particular product or service.
2. The POS computer 1130 instructs the user to wave their mobile computing device 1106 at an NFC terminal coupled to the POS computer.
3. The mobile computing device 1106 receives an NFC instruction, and in response, opens the app 1108 or another payments app that can perform the functions described herein.
4. The app 1108 displays: Merchant name (+public key); Product; Amount
5. The user authorises the transaction. The user is asked to enter a PIN value. Biometric authorisation also could be used rather than a PIN, and thus all references to using a PIN herein are intended to permit use of biometric authorisation as an alternative.
6. The user enters the PIN value, which is stored transiently by app 1108, and is instructed to swipe the token card device 1102.
7. The mobile computing device 1106 transmits the encrypted wallet 1112, payment instruction and PIN to the token card device 1102.
8. The token card device 1102 authenticates the user by comparing the entered PIN to the stored PIN 1105, decrypts the wallet 1112 using the internal secret 1104, signs the payment instruction using the decrypted wallet, producing a cryptocurrency transaction. The token card device 1102 then transmits the signed payment instruction to the mobile computing device 1106 and discards the wallet 1112.
9. The mobile computing device 1106 can transmit the transaction to the merchant via NFC, or directly to the merchant's bank using a networked data connection.
10. The merchant verifies that the transaction has been received.

An example secured direct mobile transaction may be executed using programs that implement the following algorithm. This algorithm is appropriate for web sites that offer products or services for sale and accept cryptocurrency transactions as a form of payment.

1. User clicks "pay via cryptocurrency" button on a webpage that contains a cryptocurrency wallet address. Alternatively user can input transaction parameters manually directly in app 1108.
2. The mobile computing device 1106 displays the transaction as in the previous example (items 3, 4, 5, 6, 7, 8).
3. The mobile computing device 1106 forwards the transaction to the cryptocurrency network 1150 via the cryptocurrency exchange 1120 or directly via the personal computer 1140.

In some embodiments, the token card device may comprise a small display screen and a numeric keypad. The security of the cryptocurrency transaction could be enhanced by displaying key details of the transaction on the screen before the user gives the final authentication, so that the user can verify how much is being paid and to whom it is being paid, right there on the token device.

11. OPERATIONS USING BLOCK CHAIN SYSTEMS

Although certain embodiments herein have been described in connection with use of the BITCOIN system, the technology underlying BITCOIN is the block chain. The block chain can be used not just for implementing cryptocurrencies but also for creating secure, distributed transaction ledgers for other kinds of transactions in addition to cryptocurrency transactions. For example, certain developing nations are investigating creating land rights registries and other kinds of legal registry using the block chain. In one embodiment, the system herein can interoperate with any type of distributed transaction ledger that uses the block chain, not just BITCOIN. Examples of such distributed transaction ledger systems include SCP from Stellar, Hyperledger and Ethereum, which provide developer APIs that allow a multitude of secure ledger applications to be created.

A description of five examples of the application of blockchain technology to the embodiments herein is now provided.

1. Certified Custody of Files

Created by Manuel Araoz, a 25-year-old developer in Argentina, a Proof of Existence site allows you to upload a file to certify that you had custody of it at a given time. Neither its contents nor your own personal information are ever revealed; rather, all the data in the document is digested into an encrypted number. Proof of Existence is built on top of the Bitcoin blockchain (there's a 0.005 BTC fee), so the thousands of computers on that network have now collectively verified your file.

Proof of Existence is a system which runs across the public internet and so is vulnerable to hackers who may seek to impersonate a real user. Although the blockchain itself is secure, a user name and password is still needed to access the Proof of Existence system. The system disclosed herein uses a decentralised security architecture which fits very well with the decentralized architecture of the blockchain, needing no central security server. It could provide a very convenient and secure two factor authentication system to ensure that users who log in and use the Proof of Existence system are indeed who they say they are.

2. Share Trading

Nasdaq has said it would use blockchain technology from US start-up Chain to underpin its new private share-trading market, in one of its most high profile applications to date. Former New York Stock Exchange chief Duncan Niederauer and JPMorgan banker Blythe Masters have also lent their support to start-ups exploring its use. The blockchain and the bitcoin assets it tracks set out a way to create an unforgeable, unchangeable ledger of asset ownership.

Transactions between bitcoin users are broadcast to a network of computers. The latter, known as "miners", gather together blocks of transactions and compete to verify them and receive monetary incentives in return for being "first". The blocks are secured by cryptography and other computers can verify the work. The "cost" of running the network is borne by the anonymous owners of servers. The open source code means it can be widely distributed, making it highly decentralised and difficult to change.

Banks and exchanges see a ledger updated in minutes as saving millions in collateral and settlement costs to third parties. New post-financial crisis rules have forced more over-the-counter derivatives to be processed through centralised clearing houses. That has increased demand for collateral to be sent around the financial system rapidly in order to be used as insurance for cleared derivatives trades.

The new NASDAQ private share trading market is a system which runs across the public internet and so is vulnerable to hackers who may seek to impersonate a real user. Although the blockchain itself is secure, a user name and password is still needed to access the NASDAQ system. The system disclosed herein uses a decentralised security architecture which fits very well with the decentralized architecture of the blockchain, needing no central security server. It could provide a very convenient and secure two factor authentication system to ensure that users who log in and use the NASDAQ system are indeed who they say they are.

3. Land Title Registry

Honduras, one of the poorest countries in the Americas, has agreed to use a Texas-based company to build a permanent and secure land title record system using the underlying technology behind bitcoin, a company official said late Thursday. Factom, a U.S. blockchain technology company based in Austin, Tex., will provide the service to the government of Honduras, according to the firm's president, Peter Kirby.

The blockchain is a ledger of all of a digital currency's transactions and is viewed as BITCOIN's main technological innovation. The technology is evolving beyond the digital currency, though, to applications like title databases and data verification systems.

"In the past, Honduras has struggled with land title fraud," said Kirby. "The country's database was basically hacked. So bureaucrats could get in there and they could get themselves beachfront properties." . . . "This also gives owners of the nearly 60 percent of undocumented land, an incentive to register their property officially."

The Factom system runs across the public internet and so is vulnerable to hackers who may seek to impersonate a real user. Although the blockchain itself is secure, a user name and password is still needed to access the Factom system. The present disclosure uses a decentralised security architecture which fits very well with the decentralized architecture of the blockchain, needing no central security server. It could provide a very convenient and secure two factor authentication system to ensure that users who log in and use the Factom system are indeed who they say they are.

4. Proof of Ownership of Diamonds

Diamond fraud is a big issue. In April, a London gang was convicted of "running boiler rooms that sold dozens of coloured diamonds to investors at up to 30 times their true value," the City of London announced at the time. The gang promised exorbitant potential for profit on the stones, and netted more than £1.5 million from dozens of victims. Everledger thinks its technology can tackle this: It makes it possible to check the provenance of diamonds by cross-referencing them against the ledger, preventing buyers from being ripped off. Likewise, Everledger hopes to drastically reduce diamond theft. The existence of a ledger recording the ownership and origin of the jewels will make them far harder to sell on without recutting to obscure their identifying features or serial code—and lowering their value in the process.

Everledger's ledger is built on the blockchain—the same decentralised record book that underpins BITCOIN. It means there's no one centralised server running things—instead, data is distributed across the network. Everledger uses the blockchain as its basis because of its immutability. When a bitcoin transaction is written into the blockchain it cannot be altered; similarly, it is impossible to change an entry on Everledger's ledger once it has been written. This permanence is vital in tackling fraud, meaning the ledger cannot be amended later to disguise criminal activity. (Paper certificates for diamonds certifying provenance do already exist, but there's nothing like Everledger's ledger, which is continually updateable and accessible from anywhere in the world.)

Since March, 830,000 diamonds have been added to the ledger, CEO Leanne Kemp says. Everledger began with diamonds, but Kemp has far larger ambitions. The startup is looking to move into other luxury goods, she says, and is speaking with select retailers with an eye to including high-end watches in the next 100 days. Again, the benefits are obvious: proof of ownership, tackling fraud, and a deterrent to theft. An API could also be offered to online retailers like Amazon or eBay to help prevent stolen goods being resold through their platform.

Everledger is a system which runs across the public internet and so is vulnerable to hackers who may seek to impersonate a real user. Although the blockchain itself is secure, a user name and password is still needed to access the Everledger system. The present disclosure uses a decentralised security architecture which fits very well with the decentralized architecture of the blockchain, needing no central security server. It could provide a very convenient and secure two factor authentication system to ensure that users who log in and use the Everledger system are indeed who they say they are.

5. Smart Contracts

This relatively new concept involves the development of programs that can be entrusted with money. Smart contracts are programs that encode certain conditions and outcomes. When a transaction between 2 parties occurs, the program can verify if the product/service has been sent by the supplier. Only after verification is the sum transmitted to the suppliers account. By developing ready to use programs that function on predetermined conditions between the supplier and the client, smart programs ensure a secure escrow service in real time at near zero marginal cost. One company that is making dramatic foray here is Codius which offers an ecosystem for Smart Contracts.

Apart from financial transactions, smart contracts are now entering the legal system. Companies like Empowered Law use the public distributed ledger of transactions that makes up the block chain to provide multi-signature account services for asset protection, estate planning, dispute resolution, leasing and corporate governance. A prime example of this transition is seen ins a procedure referred to as 'Coloring' a Coin, in which a house can be sold in the form of a Bitcoin payment with the same ease and speed.

Empowered Law's system runs across the public internet and so is vulnerable to hackers who may seek to impersonate a real user. Although the blockchain itself is secure, a user name and password is still needed to access the Empowered Law system. The present disclosure uses a decentralised security architecture which fits very well with the decentralized architecture of the blockchain, needing no central security server. It could provide a very convenient and secure two factor authentication system to ensure that users who log in and use the Empowered Law system are indeed who they say they are.

12. IMPLEMENTATION EXAMPLE—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk, optical disk, or solid-state drive is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1210. Volatile media includes dynamic memory, such as main memory 1206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method of conducting a cryptocurrency payment via a mobile computing device comprising:

using the mobile computing device, storing an encrypted wallet received from a portable security token that is separate from the mobile device, wherein the encrypted wallet comprises a cryptocurrency wallet encrypted with a secret key that is restricted to the portable security token;

using the mobile computing device, receiving a cryptocurrency payment instruction;

using the mobile computing device, prompting for a user credential to approve the cryptocurrency payment instruction;

using the mobile computing device, sending, to the portable security token, a message in response to receiving the user credential, wherein the message comprises the encrypted wallet, the cryptocurrency payment instruction, and the user credential; and wherein the sending of the message causes the portable security token to: decrypt, using the secret key, the cryptocurrency wallet from the encrypted wallet; in response to confirming that the user credential matches an authentication identifier registered with the portable security token, create a cryptocurrency payment transaction by digitally signing the cryptocurrency payment instruction using the cryptocurrency wallet; transmit the cryptocurrency payment transaction to a cryptocurrency network or cryptocurrency bank or exchange; and erase the cryptocurrency wallet;

wherein the confirming the user credential matches an authentication identifier registered with the portable security token comprises using any of PIN, biometric or fingerprint on the mobile device, or authentication via button press confirmation, PIN or fingerprint on the portable security token.

2. The method of claim 1, wherein the encrypted wallet is stored on a remote cloud storage location.

3. The method of claim 1, wherein the receiving of the encrypted wallet is in response to sending, to the portable security token, an encryption request that embeds the cryptocurrency wallet.

4. The method of claim 1, wherein the receiving of the encrypted wallet is in response to sending, to the portable security token, an encryption request to create the cryptocurrency wallet as a new wallet.

5. The method of claim 1, wherein the cryptocurrency payment instruction is received from one of: an application executing on the mobile device, an application executing on a separate computing device owned by a user of the mobile device, and a merchant terminal.

6. The method of claim 1, wherein the cryptocurrency payment instruction is received using one of: a cryptocurrency exchange application program interface (API), one or more near field communication (NFC) messages, and cellular or wireless Internet access.

7. The method of claim 1, wherein the receiving of the encrypted wallet from the portable security token and the sending of the message to the portable security token utilize near field communication (NFC).

8. The method of claim 1, wherein the cryptocurrency payment transaction is transmitted to the cryptocurrency network by communicating with one of: a separate computing device owned by a user of the mobile device, a merchant terminal, and a cryptographic currency exchange.

9. The method of claim 1, wherein the portable security token is one of: a wearable device, a watch, a card, and a ring; wherein the cryptocurrency wallet is a BITCOIN wallet.

10. A data processing system that is programmed to conduct a cryptocurrency payment via a mobile computing device, the system comprising:
the mobile computing device comprising stored program instructions that are programmed to cause, when executed by the mobile computing device, storing an encrypted wallet received from a portable security token that is separate from the mobile device, wherein the encrypted wallet comprises a cryptocurrency wallet encrypted with a secret key that is restricted to the portable security token;
stored program instructions that are programmed to cause, when executed by the mobile computing device, receiving a cryptocurrency payment instruction;
stored program instructions that are programmed to cause, when executed by the mobile computing device, prompting for a user credential to approve the cryptocurrency payment instruction; and
stored program instructions that are programmed to cause, when executed by the mobile computing device, sending, to the portable security token, a message in response to receiving the user credential, wherein the message comprises the encrypted wallet, the cryptocurrency payment instruction, and the user credential; and
wherein the sending of the message causes the portable security token to: decrypt, using the secret key, the cryptocurrency wallet from the encrypted wallet; in response to confirming that the user credential matches an authentication identifier registered with the portable security token, create a cryptocurrency payment transaction by digitally signing the cryptocurrency payment instruction using the cryptocurrency wallet; transmit the cryptocurrency payment transaction to a cryptocurrency network or cryptocurrency bank or exchange; and erase the cryptocurrency wallet;
wherein the confirming the user credential matches an authentication identifier registered with the portable security token comprises using any of PIN, biometric or fingerprint on the mobile device, or authentication via button press confirmation, PIN or fingerprint on the portable security token.

11. The system of claim 10, further comprising stored program instructions that are programmed to cause, when executed by the mobile computing device, storing the encrypted wallet on a remote cloud storage location.

12. The system of claim 10, wherein the authentication identifier is one of a personal identification number (PIN), or a biometric identifier such as a fingerprint.

13. The system of claim 10, further comprising stored program instructions that are programmed to cause, when executed by the mobile computing device, receiving the encrypted wallet in response to sending, to the portable security token, an encryption request that embeds the cryptocurrency wallet.

14. The system of claim 10, further comprising stored program instructions that are programmed to cause, when executed by the mobile computing device, receiving the encrypted wallet is in response to sending, to the portable security token, an encryption request to create the cryptocurrency wallet as a new wallet.

15. The system of claim 10, further comprising stored program instructions that are programmed to cause, when executed by the mobile computing device, receiving the cryptocurrency payment instruction from one of: an application executing on the mobile device, an application executing on a separate computing device owned by a user of the mobile device, and a merchant terminal.

16. The system of claim 10, further comprising stored program instructions that are programmed to cause, when executed by the mobile computing device, receiving the cryptocurrency payment instruction using one of: a cryptocurrency exchange application program interface (API), one or more near field communication (NFC) messages, and cellular or wireless Internet access.

17. The system of claim 10, further comprising stored program instructions that are programmed to cause, when executed by the mobile computing device, receiving the encrypted wallet from the portable security token and sending of the message to the portable security token using near field communication (NFC).

18. The system of claim 10, further comprising stored program instructions that are programmed to cause, when executed by the mobile computing device, transmitting the cryptocurrency payment transaction to the cryptocurrency network by communicating with one of: a separate computing device owned by a user of the mobile device, a merchant terminal, and a cryptographic currency exchange.

19. The system of claim 10, wherein the portable security token is one of: a wearable device, a watch, a card, and a ring; wherein the cryptocurrency wallet is a BITCOIN wallet.

20. A method of providing two-factor authenticated login to a server computer via a mobile computing device comprising:

using the mobile computing device, storing an encrypted wallet received from a portable security token that is separate from the mobile device, wherein the encrypted wallet comprises a transaction wallet encrypted with a secret key that is restricted to the portable security token;

using the mobile computing device, receiving an instruction relating to logging in to a server computer that is associated with a secure application program that uses a block chain;

using the mobile computing device, prompting for a user credential to approve the instruction;

using the mobile computing device, sending, to the portable security token, a message in response to receiving the user credential, wherein the message comprises the encrypted wallet, the instruction, and the user credential; and wherein the sending of the message causes the portable security token to: decrypt, using the secret key, the transaction wallet from the encrypted wallet; in response to confirming that the user credential matches an authentication identifier registered with the portable security token, create a login transaction by digitally signing the cryptocurrency payment instruction using the transaction wallet; transmit the login transaction to the secure application program that uses the block chain; and erase the transaction wallet;

wherein the confirming the user credential matches an authentication identifier registered with the portable security token comprises using any of PIN, biometric or fingerprint on the mobile device, or authentication via button press confirmation, PIN or fingerprint on the portable security token.

21. The method of claim 20, wherein the encrypted wallet is stored on a remote cloud storage location.

22. The method of claim 20, wherein the instruction is received from one of: an application executing on the mobile device, an application executing on a separate computing device associated with a user of the mobile device; and a server computer.

23. The method of claim 20, wherein the instruction is received using an application program interface (API) of a server computer application that uses the block chain.

24. The method of claim 21, wherein the receiving of the encrypted wallet from the portable security token and the sending of the message to the portable security token utilize near field communication (NFC).

* * * * *